(12) United States Patent  
Takeuchi

(10) Patent No.: US 8,106,548 B2  
(45) Date of Patent: Jan. 31, 2012

(54) ELECTRIC MOTOR DEVICE

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/086,944

(22) Filed: Apr. 14, 2011

(65) Prior Publication Data

US 2011/0187242 A1     Aug. 4, 2011

Related U.S. Application Data

(63) Continuation of application No. 12/270,930, filed on Nov. 14, 2008, now Pat. No. 7,948,141.

(30) Foreign Application Priority Data

Nov. 22, 2007  (JP) ................................ 2007-302854  
Apr. 10, 2008  (JP) ................................ 2008-102483

(51) Int. Cl.  
*H02K 11/00*    (2006.01)

(52) U.S. Cl. ................. 310/68 B; 310/191; 310/103

(58) Field of Classification Search .............. 310/103, 310/113–114, 191, 268, 68 B  
See application file for complete search history.

(56) References Cited

U.S. PATENT DOCUMENTS

| | | | |
|---|---|---|---|
| 3,233,133 A | 2/1966 | Kober | |
| 3,469,130 A | 9/1969 | Jines et al. | |
| 4,959,578 A | 9/1990 | Varga | |
| 5,148,069 A * | 9/1992 | Nonaka et al. | 310/68 R |
| 5,473,209 A | 12/1995 | Lamb | |
| 5,498,919 A * | 3/1996 | Bahn | 310/268 |
| 5,646,467 A | 7/1997 | Floresta et al. | |
| 5,994,803 A * | 11/1999 | Jung | 310/51 |
| 6,057,622 A | 5/2000 | Hsu | |
| 6,072,258 A | 6/2000 | Lamb | |
| 6,137,203 A | 10/2000 | Jermakian et al. | |
| 6,310,473 B1 * | 10/2001 | Zhao | 324/207.25 |
| 6,355,998 B1 * | 3/2002 | Schob et al. | 310/68 B |
| 6,492,753 B2 * | 12/2002 | Zepp et al. | 310/90 |
| 6,586,857 B2 * | 7/2003 | Hsu | 310/156.05 |
| 7,402,929 B1 * | 7/2008 | Dilliner | 310/152 |
| 7,408,278 B2 * | 8/2008 | Murota et al. | 310/75 R |
| 7,468,568 B2 * | 12/2008 | Naito et al. | 310/191 |
| 7,550,894 B2 * | 6/2009 | Hino et al. | 310/268 |
| 7,671,503 B2 * | 3/2010 | Naito et al. | 310/191 |
| 7,750,527 B2 * | 7/2010 | Shibukawa | 310/191 |
| 2005/0099083 A1 | 5/2005 | Hsu | |
| 2006/0267436 A1 | 11/2006 | Naito et al. | |

FOREIGN PATENT DOCUMENTS

WO    WO2005-112230    11/2005

* cited by examiner

*Primary Examiner* — Thanh Lam  
(74) *Attorney, Agent, or Firm* — Harness, Dickey & Pierce, P.L.C.

(57) ABSTRACT

The electric motor device is provided. The electric motor device includes: a first drive member that has a plurality of permanent magnets; a second drive member that has a plurality of electromagnetic coils; and a clearance controller that shifts at least either one of the first drive member and the second drive member, thereby changing a size of a clearance formed between the first drive member and the second drive member.

14 Claims, 30 Drawing Sheets

AC drive signal

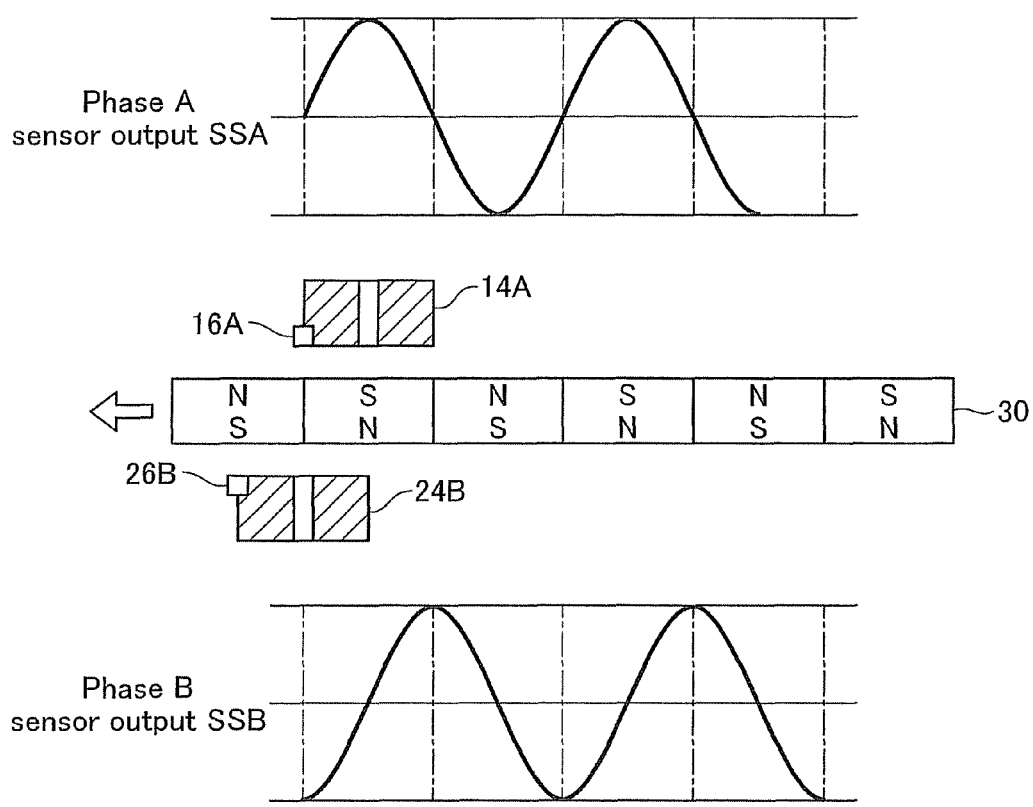

Phase = just prior to 2π (Phase A reverses polarity at 2π)

Phase = π/4

Phase = just prior to π/2 (Phase B reverses polarity at π/2)

Phase = 3π/4

Relative clearance G =0

Relative clearance G = G1+G2

Fig.14A
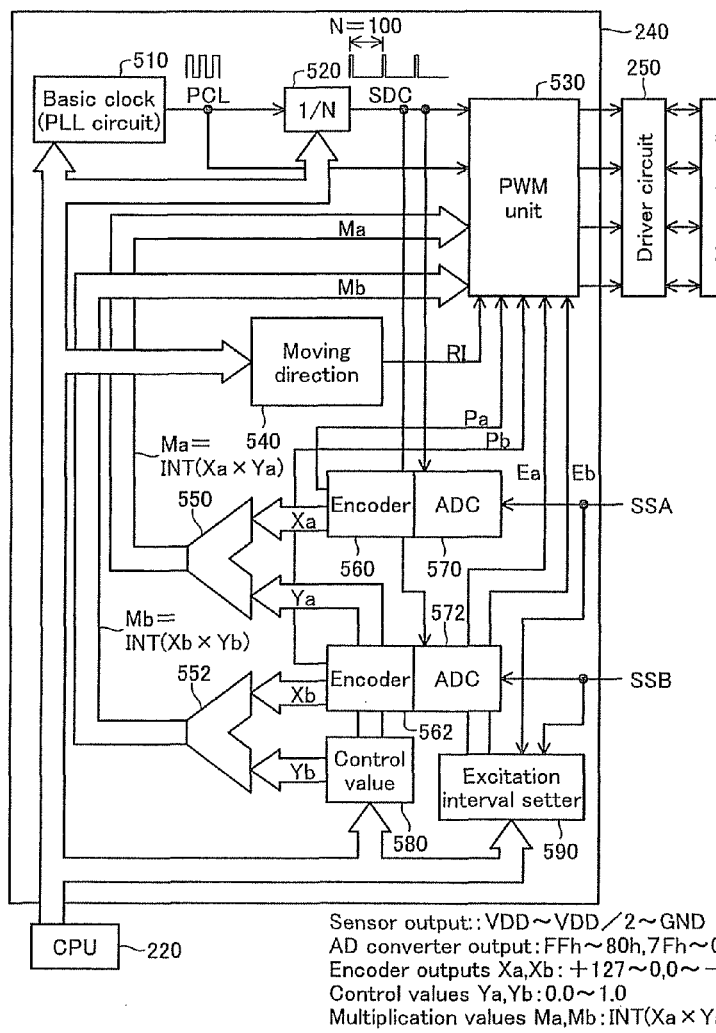
Fig.14B   DRVA1+DRVA2
Fig.14C   DRVA1+DRVA2
Fig.14D   DRVA1+DRVA2
Fig.14E   DRVA1+DRVA2
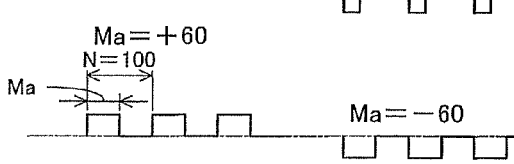

Fig.15A
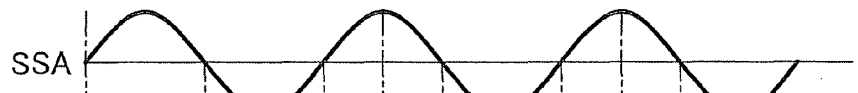
SSA
Fig.15B
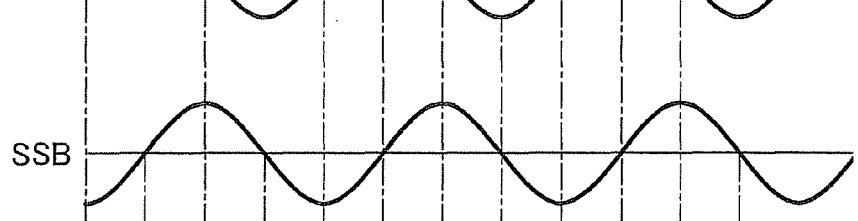
SSB
Fig.15C
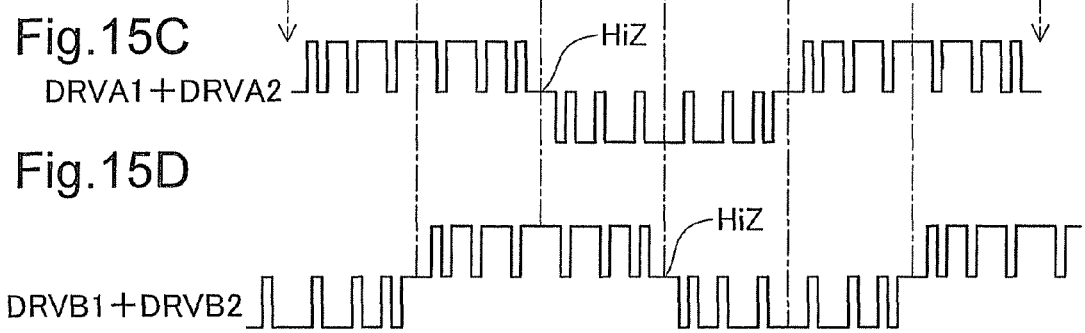
DRVA1+DRVA2 — HiZ
Fig.15D
DRVB1+DRVB2 — HiZ
Fig.15E
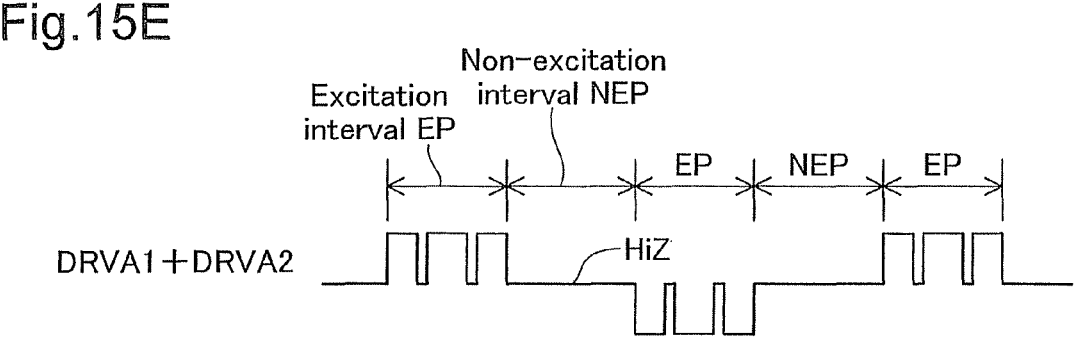
Excitation interval EP  Non-excitation interval NEP  EP  NEP  EP
DRVA1+DRVA2 — HiZ
Fig.15F
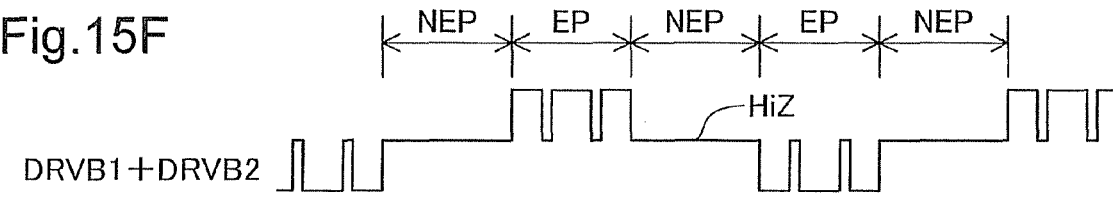
NEP  EP  NEP  EP  NEP
DRVB1+DRVB2 — HiZ During reverse rotation(RI="H")

Relative clearance G =0

Relative clearance G = G1+G2

ELECTRIC MOTOR DEVICE

CROSS-REFERENCE TO RELATED APPLICATIONS

This is a continuation application of U.S. Ser. No. 12/270, 930 filed Nov. 14, 2008 which claims the priority based on Japanese Patent Applications No. 2007-302854 filed on Nov. 22, 2007, and No. 2008-102483 filed on Apr. 10, 2008, the disclosures of which are hereby incorporated by reference in their entireties.

BACKGROUND OF THE INVENTION

1. Field of the Invention

The present invention relates to an electric motor device.

2. Description of the Related Art

A proposed technique for an electric motor device is disclosed in, for example, International Publication No. WO2005/112230 A1.

Under application of a fixed load, the motor of this related art structure has a fixed rotation speed in a steady state at a constant applied voltage to the motor. An increase in applied voltage is thus only the way to increase the rotation speed of the motor in the steady state under application of the fixed load to the motor.

SUMMARY

An object of the present invention is to provide technology that enables a change in torque or a change in rotation speed of the electric motor device by a different technique from the conventional technique of varying the applied voltage.

According to an aspect of the present invention, an electric motor device is provided. The electric motor device comprises: a first drive member that has a plurality of permanent magnets; a second drive member that has a plurality of electromagnetic coils; and a clearance controller that shifts at least either one of the first drive member and the second drive member, thereby changing a size of a clearance formed between the first drive member and the second drive member.

Changing the size of a clearance formed between the first drive member and the second drive member varies the density of a magnetic flux passing through the electromagnetic coils and changes a back electromotive force generated in the electromagnetic coils. The arrangement of the electric motor device according to this aspect of the invention thus enables a change in torque or a change in rotation speed of the electric motor device by the different technique from the conventional technique of varying the applied voltage.

The technique of the invention is actualized by diversity of applications, for example, an electric motor and its control method, as well as a moving body, a rail car, a projector, a cell phone, a robot, an actuator, and variety of other electronic devices equipped with the electric motor.

BRIEF DESCRIPTION OF THE DRAWINGS

FIG. 4 is an illustration depicting magnetic sensor waveforms;

FIGS. 14A to 14E show the internal configuration and operation of the drive controller 240;

FIGS. 15A to 15F depict correspondence relationships between sensor output waveforms and waveforms of drive signals generated by the PWM unit 530;

DESCRIPTION OF THE PREFERRED EMBODIMENT

Next, aspects of the present invention will be described in the following order on the basis of embodiments:
A. First Embodiment:
 A1. General Configuration and Operations of Electric Motor Device:
 A2. Structure of Clearance Control Mechanism:
B. Second Embodiment:
C. Third Embodiment:
D. Modified Examples:
E. Modified Examples:

A. First Embodiment

A1. General Configuration and Operations of Electric Motor Device

Figure 1:
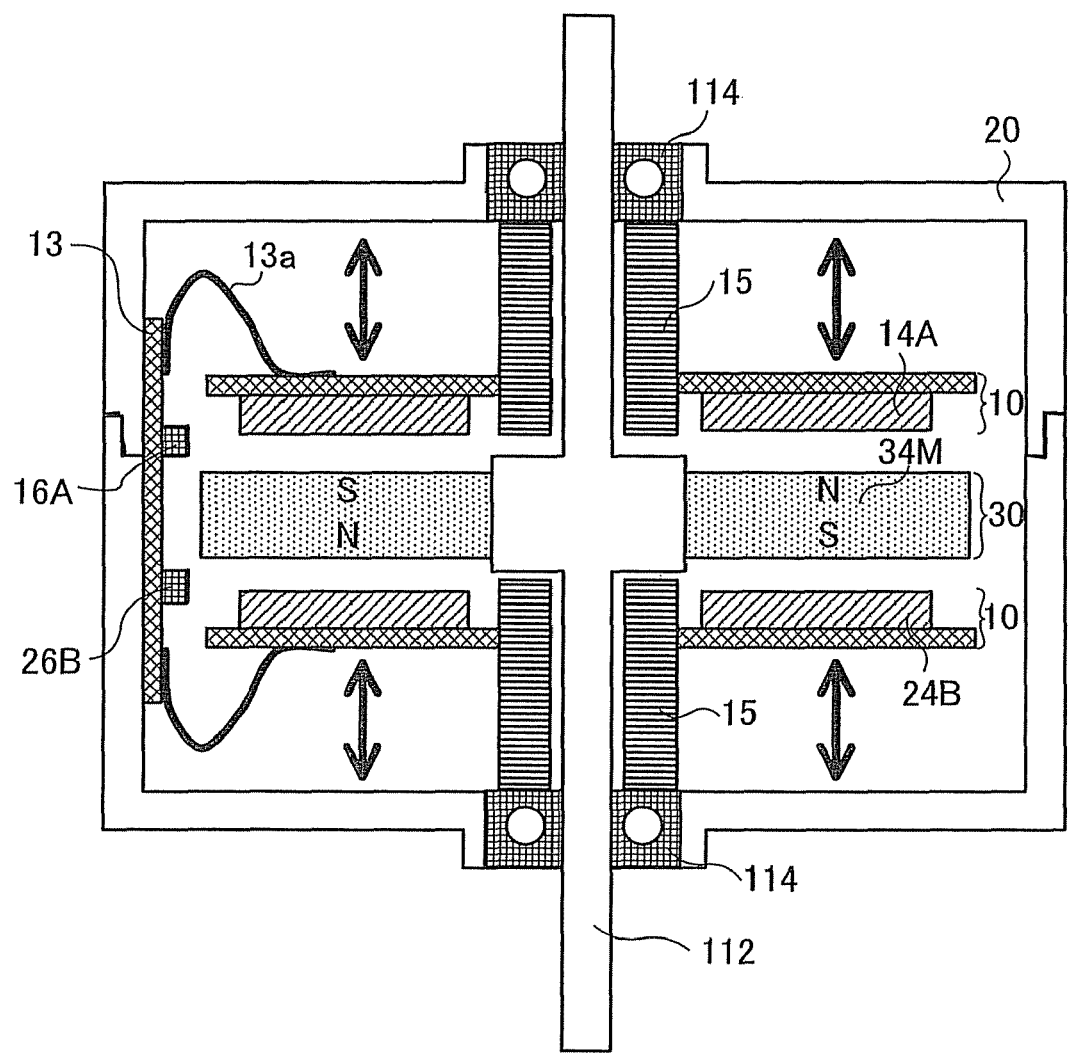
FIG. 1 is a sectional view showing the structure of a motor main body 100 in one embodiment of the invention.

FIG. 1 is a sectional view showing the structure of a motor main body 100 in one embodiment of the invention. The motor main body 100 includes two substantially disk-shaped stators 10 and one substantially disk-shaped rotor 30. The rotor 30 has a magnet array 34M of multiple magnets and is fastened to a rotating shaft 112. The magnetizing direction of the magnet array 34M is a vertical direction. The two stators 10 are arranged across the rotor 30. The stator 10 arranged above the rotor 30 (hereafter may be referred to as the upper stator 10) has an phase A coil array 14A, while the stator 10 arranged below the rotor 30 (hereafter may be referred to as the lower stator 10) has a phase B coil array 24B. A clearance control mechanism 15 shifts the two stators 10 in the vertical direction to change the sizes of clearances formed between the two stators 10 and the rotor 30. The reason of changing the sizes of the clearances will be discussed later. The stators 10 and the rotor 30 are surrounded by a casing 20. Bearings 114 are provided in contact sites of the rotating shaft 112 with the casing 20. A board 13 is provided on the inner circumference of the casing 20, and analog magnetic sensors 16A and 26B are mounted on the board 13. Flexible cables 13a interconnect the board 13 with the respective stators 10 to allow communication of sensor signals between the board 13 and the stators 10. The analog magnetic sensors 16A and 26B are located on the inner circumference of the casing 20, in order to keep the positional relations of the analog magnetic sensors 16A and 26B to the rotor 30 unchanged even when the stators 10 are shifted in the vertical direction. The unchanged positional relations of the analog magnetic sensors 16A and 26B to the rotor 30 ensure stable detection of the phase of the rotor 30 by the magnetic sensors 16A and 26B. This layout is, however, not restrictive, but the analog magnetic sensors 16A and 26B may be provided on the respective stators 10.

Figure 2A:
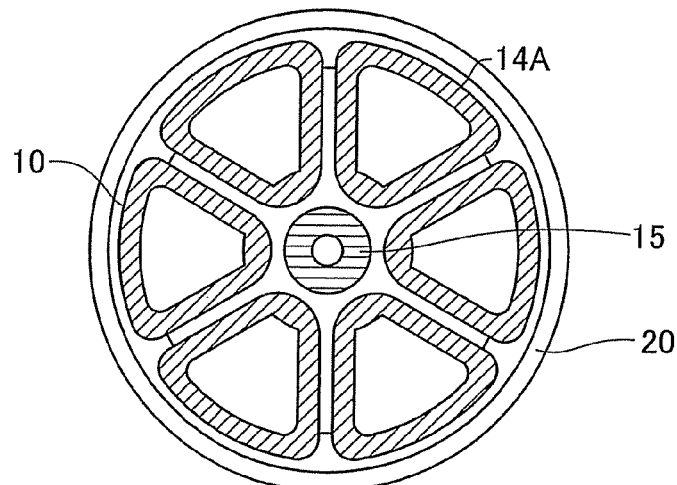
FIGS. 2A through 2C respectively show the phase A coil array 14A on the upper stator 10, the rotor 30, and the phase B coil array 24B on the lower stator 10.
Figure 2B:
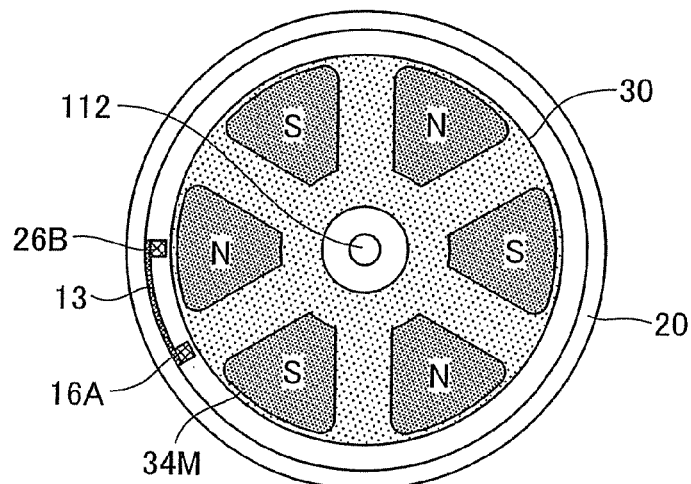
Figure 2C:
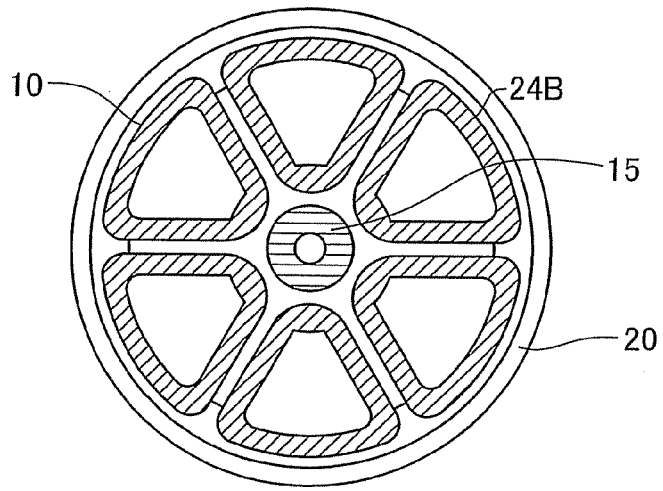

FIGS. 2A through 2C respectively show the phase A coil array 14A on the upper stator 10, the rotor 30, and the phase B coil array 24B on the lower stator 10. In this illustrated example, each of the phase A coil array 14A and the phase B coil array 24B has six coils, while the magnet array 34M also has six magnets. The number of coils and the number of magnets are, however, not restricted to six but may be set arbitrarily.

Figure 3A:
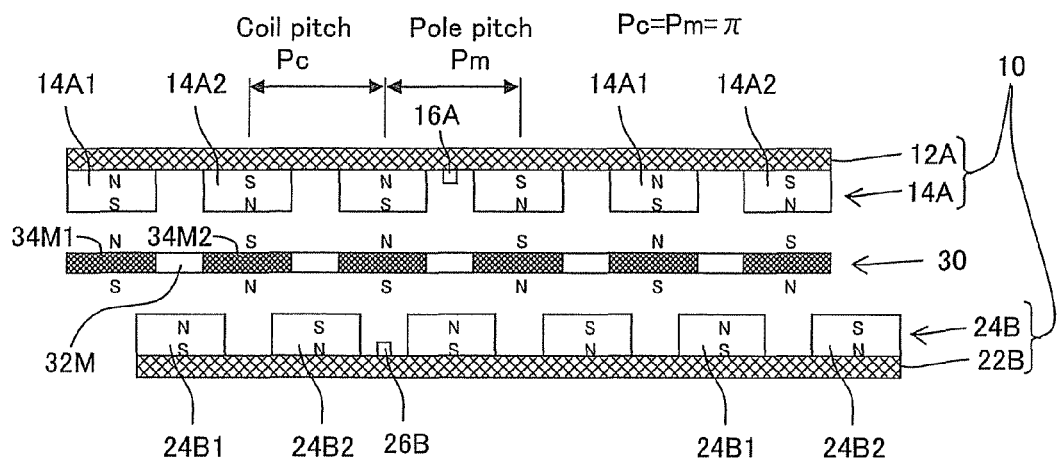
FIG. 3A depicts the positional relationship of coil arrays 14A, 24B and the magnet array 34M.

FIG. 3A depicts the positional relationship of coil arrays 14A, 24B and the magnet array 34M. The Phase A coil array 14A is affixed to a support member 12A, while the Phase B coil array 24B is affixed to a support member 22B. The Phase A coil array 14A includes two types of coils 14A1, 14A2 excited in opposite directions and arranged in alternating fashion at a constant pitch Pc. In the state shown in FIG. 3A, the three coils 14A1 are excited such that their direction of magnetization (the direction from the N pole to the S pole) is oriented downward; the other three coils 14A2 are excited such that their direction of magnetization is oriented upward. Likewise, the Phase B coil array 24B is composed of two types of coils 24B1, 24B2 excited in opposite directions and arranged in alternating fashion at the constant pitch Pc. Herein, "coil pitch Pc" is defined as the pitch of the coils of the Phase A coil array, or the pitch of the coils of the Phase B coil array.

The magnet array 34M of the rotor unit 30 is affixed to a support member 32M. The permanent magnets of this magnet array 34M are oriented respectively with their direction of magnetization facing in the direction perpendicular to the direction of placement of the magnet array 34M; the latter is the left-right direction in FIG. 3A. The magnets of the magnet array 34M are arranged at constant magnetic pole pitch Pm. In this example, the magnetic pole pitch Pm is equal to the coil pitch Pc, and in terms of electrical angle is equivalent to $\pi$. Electrical angle of $2\pi$ is associated with the mechanical angle or distance when the phase of the drive signal presented to the coil array changes by $2\pi$. In the present embodiment, when the phase of the drive signals of the Phase A coil array 14A and the Phase B coil array 24B changes by $2\pi$, the magnet array 34M undergoes displacement by the equivalent of twice the coil pitch Pc.

The Phase A coil array 14A and the Phase B coil array 24B are positioned at locations differing from one another by $\pi/2$ in terms of electrical angle. The Phase A coil array 14A and the Phase B coil array 24B differ only in location, and in other respects have substantially identical configuration. Consequently, only the example of the Phase A coil array 14A will be discussed below, except where there is a particular need during discussion of the coil array.

Figure 3B:
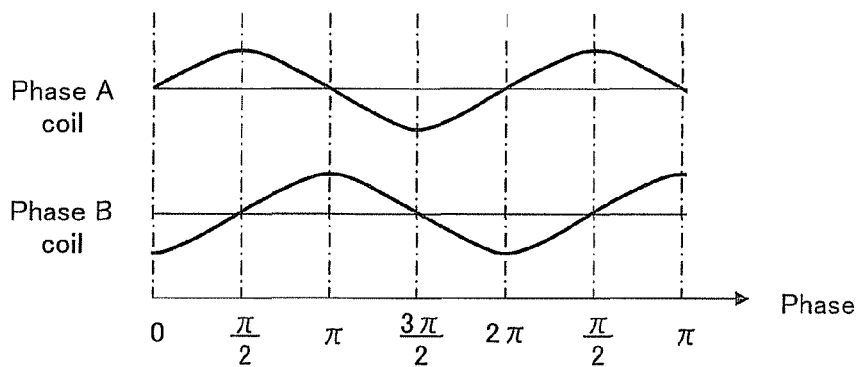
FIG. 3B depicts exemplary waveforms of AC drive signals presented to the Phase A coil array 14A and the Phase B coil array 24B.

FIG. 3B depicts exemplary waveforms of AC drive signals presented to the Phase A coil array 14A and the Phase B coil array 24B. The Phase A coil array 14A and the Phase B coil array 24B are presented respectively with two-phase AC signals. The drive signals of the Phase A coil array 14A and the Phase B coil array 24B are phase-shifted by $\pi/2$ with respect to one another. The state of FIG. 3A corresponds to the zero phase or $2\pi$ state.

As shown in FIG. 3A, the motor main body 100 has the analog magnetic sensor 16A for the phase A coil array 14A and the analog magnetic sensor 26B for the phase B coil array 24B. In the description hereafter, the analog magnetic sensor 16A for the phase A coil array 14A and the analog magnetic sensor 26B for the phase B coil array 24B are respectively referred to as the 'phase A sensor 16A' and the 'phase B sensor 26B'. In the illustration of FIG. 3A, the Phase A sensor 16A and the Phase B sensor 26B are respectively provided on the upper stator 10 and on the lower stator 10. The Phase A sensor 16A and the Phase B sensor 26B may alternatively be provided on the inner circumferential of the casing 20 as shown in FIG. 1. The Phase A sensor 16A is located on the center of two coils in the phase A coil array 14A, while the Phase B sensor 26B is located on the center of two coils in the B-phase coil array 24B. The analog outputs of these sensors 16A and 26B are used to generate the AC drive signals shown in FIG. 3B. Hall ICs taking advantage of the Hall effects may be adopted for the Phase A sensor 16A and the Phase B sensor 26B.

FIG. 4 is an illustration depicting magnetic sensor waveforms. In this example, the Phase A sensor output SSA and the Phase B sensor output SSB are both sine waves. These sensor outputs have waveform shape substantially identical to that of back electromagnetic force of the Phase A coil 14A and the Phase B coil 24B. The back electromagnetic force waveform is dependent on the shape of the coils and the positional relationship of the magnets and the coils, but is typically a sine wave or a shape very close to a sine wave.

In general, an electric motor functions as an energy conversion device that converts between mechanical energy and electrical energy. The back electromagnetic force of the coils represents mechanical energy of the motor converted to electrical energy. Consequently, where electrical energy applied to the coils is converted to mechanical energy (that is, where the motor is driven), it is possible to drive the motor with maximum efficiency by means of application of voltage having waveform identical to that of the back electromagnetic force. As will be discussed below, "voltage having waveform identical to that of the back electromagnetic force" means voltage that generates current in the opposite direction to the back electromagnetic force.

Figure 5A:
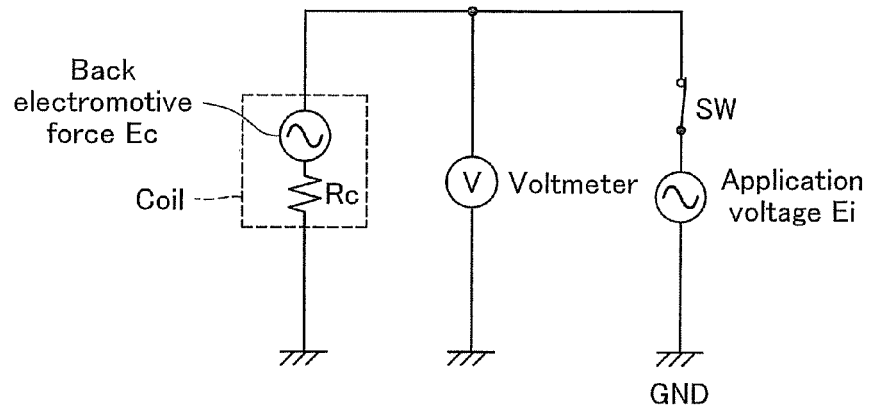
FIG. 5A is a schematic diagram showing a relation between an applied voltage to the coil and a back electromotive force.

FIG. 5A is a schematic diagram showing a relation between an applied voltage to the coil and a back electromotive force. The coil is simulated by the combination of an AC back electromotive force (back EMF) Ec and a resistance Rc. In this circuit, a voltmeter V is connected in parallel with an applied AC voltage Ei and the coil. In the description hereafter, the back EMF Ec and the applied voltage Ei may respectively be referred to as the 'induced voltage Ec' and the 'excitation voltage Ei'. Application of the AC voltage Ei to the coil actuates the motor and causes the back EMF Ec to be generated in a direction of electric current opposite to the applied voltage Ei. The back EMF Ec is measurable by the voltmeter V at an open position of a switch SW in the state of rotation of the motor. The polarity of the back EMF Ec measured at the open position of the switch SW is the same as the polarity of the applied voltage Ei measured at a closed position of the switch SW. In the specification hereof, the expression of 'application of a voltage having a substantially similar waveform to that of the back EMF' means application of a voltage having a substantially similar waveform to and the same polarity as those of the back EMF Ec measured by the voltmeter V.

Figure 5B:
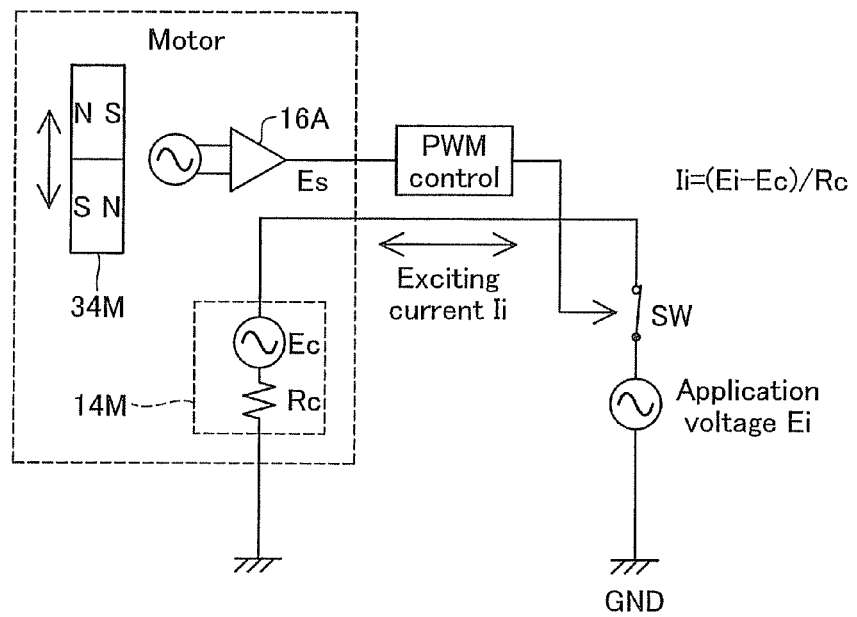
FIG. 5B schematically shows a driving method adopted in the embodiment.

FIG. 5B schematically shows a driving method adopted in the embodiment. The motor is simulated by the combination of an phase A coil 14A, a permanent magnet 34M, and an Phase A sensor 16A. In response to rotation of the rotor 30 with the permanent magnet 34M, an AC voltage Es (hereafter may also be referred to as 'sensor voltage Es') is generated in the sensor 16A. The sensor voltage Es has a similar waveform to that of the induced voltage Ec of the coil 14A. Thus, by generating PWM signal which simulates the sensor voltage Es for on/off control of the switch SW it will be possible to apply to the coils 14A exciting voltage Ei of substantially similar waveform to the induced voltage Ec. In this state, an excitation current Ii is given as Ii=(Ei−Ec)/Rc.

As discussed above, application of a voltage having the similar waveform to that of the back EMF enables the motor to be driven at the maximum efficiency. The energy conversion efficiency is relatively low in the vicinity of medium points of the back EMF sine wave (in the vicinity of zero voltage) but is relatively high in the vicinity of peaks of the back EMF sine wave. Application of a voltage having the similar waveform to that of the back EMF for actuation of the motor causes a relatively high voltage to be applied in a period of the high energy conversion efficiency and thereby enhances the motor efficiency. Application of a voltage in a simple rectangular waveform for actuation of the motor, on the other hand, causes a significant voltage to be applied even in the vicinity of the medium point having the substantially zero back EMF and thereby lowers the motor efficiency. Application of a voltage in a period of the low energy conversion efficiency generates a vibration in a direction other than the rotating direction by eddy current and thereby causes noise.

As clearly understood from such discussion, application of a voltage having the similar waveform to that of the back EMF for actuation of the motor desirably improves the motor efficiency and advantageously reduces the vibration and the noise.

Figure 6A:
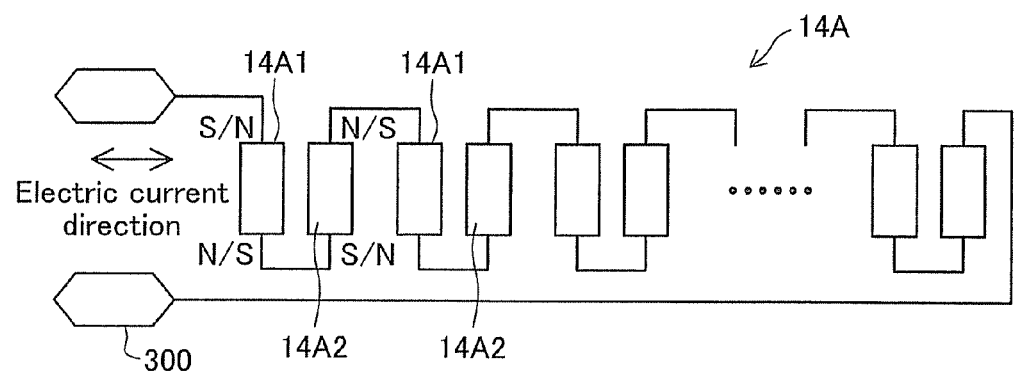
FIGS. 6A and 6B show connection methods of the two different types of coils 14A1 and 14A2 in the phase A coil array 14A.
Figure 6B:
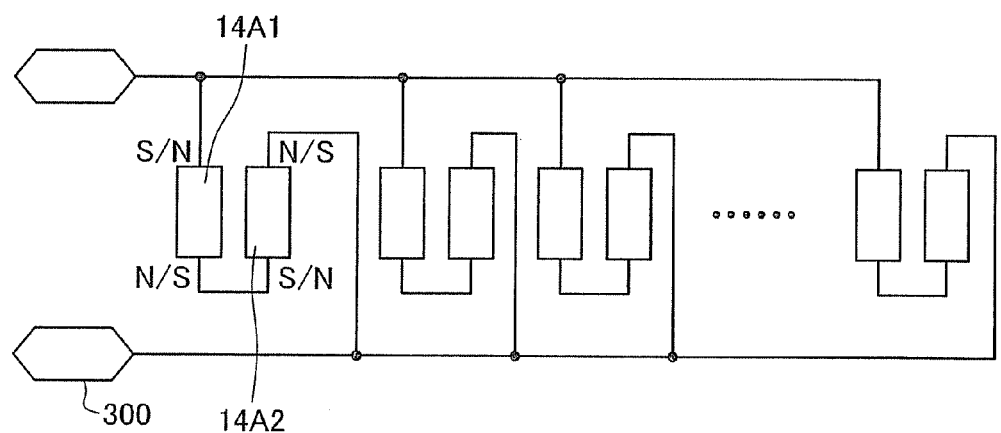

FIGS. 6A and 6B show connection methods of the two different types of coils 14A1 and 14A2 in the phase A coil array 14A. The connection method of FIG. 6A has serial connection of all the coils included in the phase A coil array 14A. The connection method of FIG. 6B, on the other hand, has parallel connection of multiple pairs of the two different types of coils 14A1 and 14A2 connected in series. In either of these two connection methods, the two different types of coils 14A1 and 14A2 are magnetized in opposite polarities.

FIGS. 7A to 7D depict operation of the electric motor of the present embodiment. In this example, rightward displacement of the magnet array 34M with respect to the coil arrays 14A, 24B over time is depicted. The left-right direction in the drawings can be understood to correspond to the rotation direction of the rotor unit 30 shown in FIG. 1.

Figure 7A:
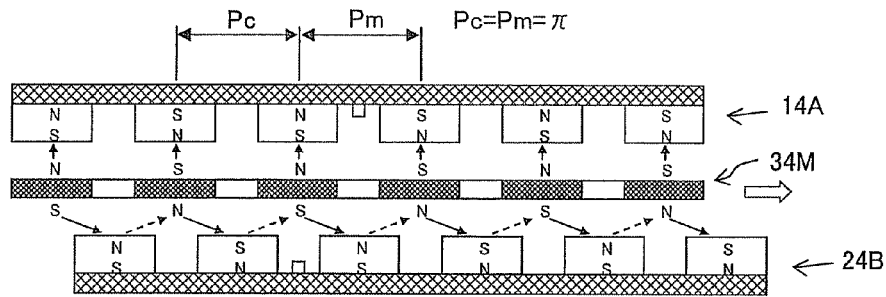
FIGS. 7A to 7D depict operation of the electric motor of the present embodiment.

FIG. 7A depicts the state at the timing when the phase is just prior to $2\pi$. The solid arrows drawn between coils and magnets denote the attraction direction, and the broken arrows denote the repulsion direction. In this state, the Phase A coil array 14A does not impart driving force in the operating direction (left-right direction in the drawing) to the magnet array 34M, and magnetic force acts in the direction drawing the magnet array 34M towards the Phase A coil array 14A. Consequently, application voltage to the Phase A coil array 14A will preferably go to zero at the timing coincident with the phase of $2\pi$. On the other hand, the Phase B coil array 24B does impart driving force in the operating direction to the magnet array 34M. Moreover, since the Phase B coil array 24B imparts not only attracting force but also repelling force to the magnet array 34M, zero net force is applied in the vertical direction (direction perpendicular to the operating direction of the magnet array 34M) to the magnet array 34M by the Phase B coil array 24B. Consequently, application voltage to the Phase B coil array 24B will preferably go to peak value at the timing coincident with the phase of $2\pi$.

Figure 7B:
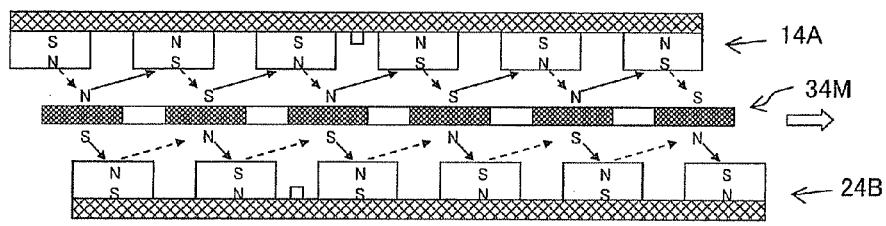
Figure 7C:
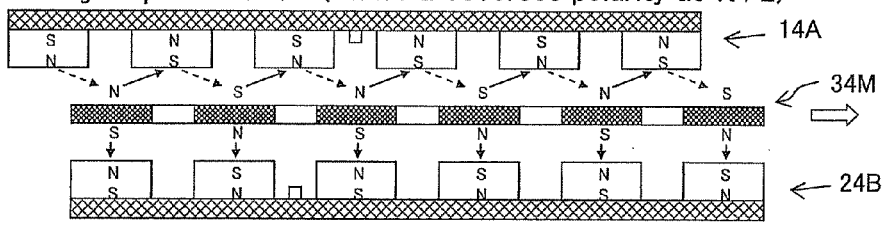
Figure 7D:
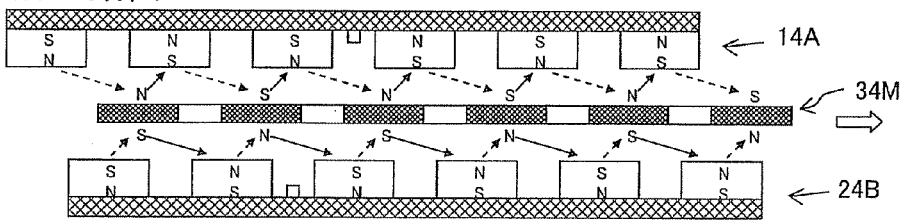

As shown in FIG. 7B, the Phase A coil array 14A reverses polarity at the timing coincident with the phase of $2\pi$. FIG. 7B depicts the state where the phase is $\pi/4$; polarity of the Phase A coil array 14A is now the reverse of that in FIG. 7A. In this state, both the Phase A coil array 14A and the Phase B coil array 24B impart identical driving force in the operating direction to the magnet array 34M. FIG. 7C depicts the state where the phase is just prior to π/2. In this state, which is the opposite of the state of FIG. 7A, only the Phase A coil array 14A imparts driving force in the operating direction to the magnet array 34M. At the timing coincident with the phase of π/2, the polarity of the Phase B coil array 24B reverses, producing the polarity depicted in FIG. 7D. FIG. 7D depicts the state where the phase is 3π/4. In this state, both the Phase A coil array 14A and the Phase B coil array 24B impart identical driving force in the operating direction to the magnet array 34M.

As will be understood from FIGS. 7A to 7D, polarity of the Phase A coil array 14A switches at the timing when the coils of the Phase A coil array 14A are situated in opposition to the magnets of the magnet array 34M. The Phase B coil array behaves in the same way. As a result, driving force will be generated substantially constantly from all of the coils, making it possible to generate a high level of torque.

The operation during the period where the phase is between π and 2π is substantially the same as that shown in FIGS. 7A to 7D, and need not be described in detail. However, it should be noted that polarity of the Phase A coil array 14A again reverses at the timing coincident with the phase of π, and polarity of the Phase B coil array 24B again reverses at the timing coincident with the phase of 3π/2.

As will be understood from the preceding discussion, the electric motor of the present embodiment affords driving force of the magnet array 34M in the operating direction, by utilizing attracting force and repelling force between the magnet array 34M and the coil arrays 14A, 24B. In particular, in the present embodiment, since the coil arrays 14A, 24B are situated at opposite sides of the magnet array 34M, magnetic flux to both sides of the magnet array 34M will be utilized for generating driving force. Consequently, utilization of magnetic flux is higher in comparison to where only one side of the magnets is utilized for generating driving force as in conventional electric motors, thereby affording a motor with good efficiency and high torque. However, it would be possible to omit one of the two coil arrays 14A, 24B. The coil arrays 14A and 24B may be designed to have no magnetic cores. The above description with reference to FIG. 7 explains the phenomenon of generating the driving force based on the attractive force and the repulsive force. The phenomenon of generating the driving force (electromagnetic force) is explainable according to the Fleming's left-hand rule.

In preferred practice, the support members 12A, 22B, 32M will be respectively formed from nonmagnetic material. Also, in preferred practice, among the various components of the motor unit of the present embodiment, all components except for the electrical wiring including the coils and sensors, the magnets, and the rotating shaft and its bearings will be formed from materials that are nonmagnetic and electrically nonconductive. By dispensing with a core made of a magnetic body, it is possible to achieve smooth and consistent operation, without the occurrence of cogging. By dispensing with a yoke as part of the magnetic circuit, excitation loss (eddy-current loss) will be held to very low levels, and a motor with good efficiency attained.

A2. Structure of Clearance Control Mechanism

Figure 8A:
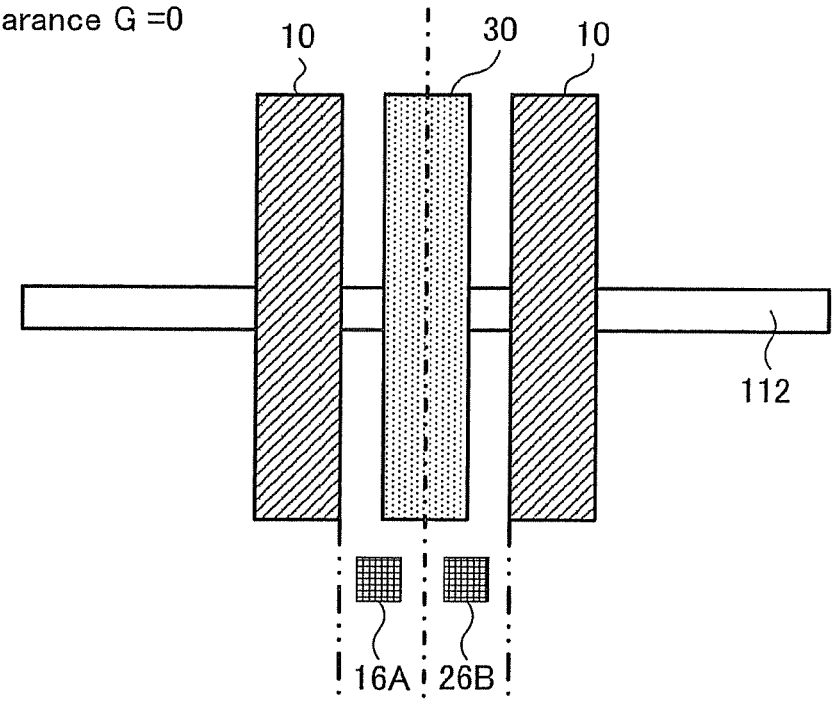
FIGS. 8A and 8B show the sizes of clearances formed between the stators 10 and the rotor 30.
Figure 8B:
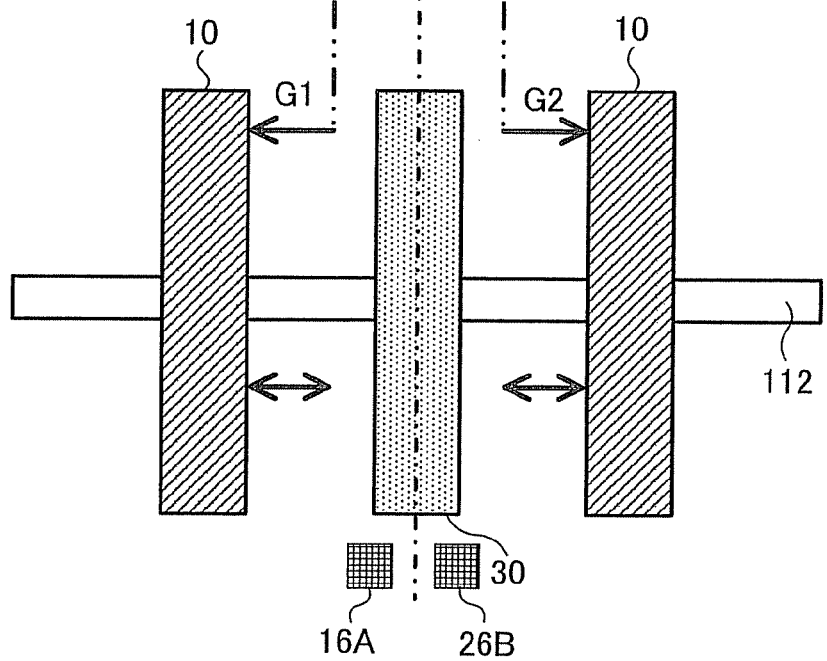

FIGS. 8A and 8B show the sizes of clearances formed between the stators 10 and the rotor 30. In the state of FIG. 8A, the stators 10 are at the closest positions to the rotor 30. A relative clearance G is defined as zero in this initial state of FIG. 8A. As explained previously with reference to FIG. 1, the stators 10 are movable in the vertical direction (that is, the horizontal direction in FIGS. 8A and 8B) by the clearance control mechanism 15. In the state of FIG. 8B, the stators 10 are shifted by the clearance control mechanism 15. The relative clearance G is defined as G1+G2>0 in the state of FIG. 8B when the stators 10 are shifted from the initial state to have larger clearances to the rotor 30.

Figure 9:
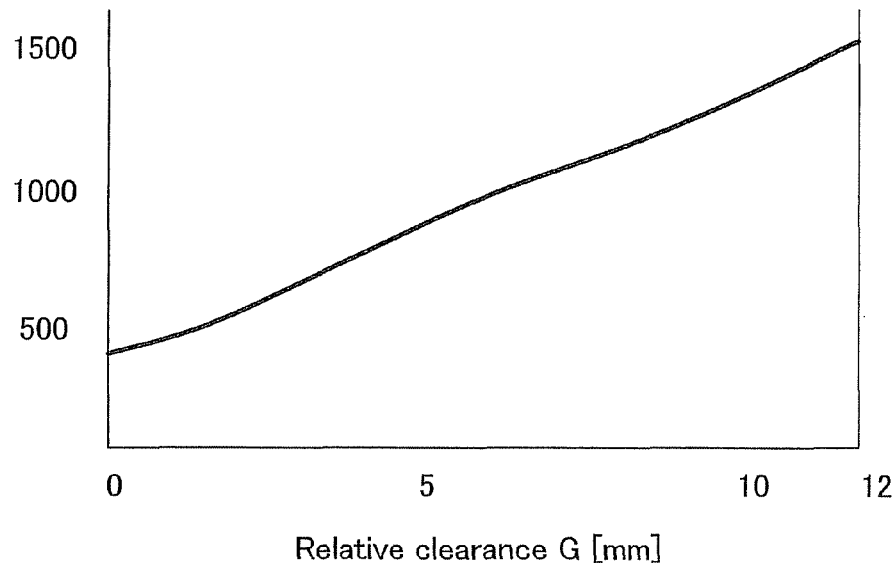
FIG. 9 is a graph showing a variation in rotation speed of the motor under no load condition against the relative clearance G.

FIG. 9 is a graph showing a variation in rotation speed of the motor under no load condition against the relative clearance G. This graph is drawn based on the observed data. Increasing the relative clearance G formed between the stators 10 and the rotor 30 by the clearance control mechanism 15 increases the rotation speed of the motor under no load condition. The reason of this phenomenon will be discussed later.

An electric current Ii flowing through an electromagnetic coil is expressed as Equation (1) given below according to the Ohm's law:

$$Ii=(Ei-Ec)/Rc \quad (1)$$

where Ii, Ei, Ec, and Rc respectively denote the electric current flowing through the electromagnetic coil, an applied voltage to the electromagnetic coil, a back EMF generated in the electromagnetic coil, and an internal resistance of the electromagnetic coil.

A torque T produced between the stators 10 and the rotor 30 is proportional to the electric current Ii flowing through the electromagnetic coil and a magnetic flux density B and it thus expressed by Equation (2) given below:

$$T=K_1 \times B \times Ii \quad (2)$$

where $K_1$ denotes a proportional constant.

The back EMF Ec is proportional to the magnetic flux density B and a rotation speed ω of the motor and is thus expressed by Equation (3) given below:

$$Ec=K_2 \times B \times \omega \quad (3)$$

where $K_2$ denotes a proportional constant.

Elimination of Ii from Equations (1) and (2) gives Equation (4) below:

$$Ec=Ei-(T \times Rc)/(K_1 \times B) \quad (4)$$

Elimination of Ec from Equations (3) and (4) gives Equation (5) below:

$$\omega=-Rc/(K_1 \times K_2 \times B^2) \times T+Ei/(K_2 \times B) \quad (5)$$

where $K_1$, $K_2$, Rc, and Ec are constants (when the applied voltage Ei is fixed). Equation (5) is then rewritten as Equation (8) given below where K3 and K4 are defined by Equations (6) and (7):

$$K_3=Rc/(K_1 \times K_2) \quad (6)$$

$$K_4=Ei/K_2 \quad (7)$$

$$\omega=-K_3/B^2 \times T+K_4/B \quad (8)$$

Equation (8) shows a linear relation between the torque T and the rotation speed ω of the motor. Increasing the relative clearance G by the clearance control mechanism 15 decreases the magnetic flux density B passing through the electromagnetic coil and changes the slope and the intercept of the linear curve representing the relation between the torque T and the rotation speed ω.

Figure 10:
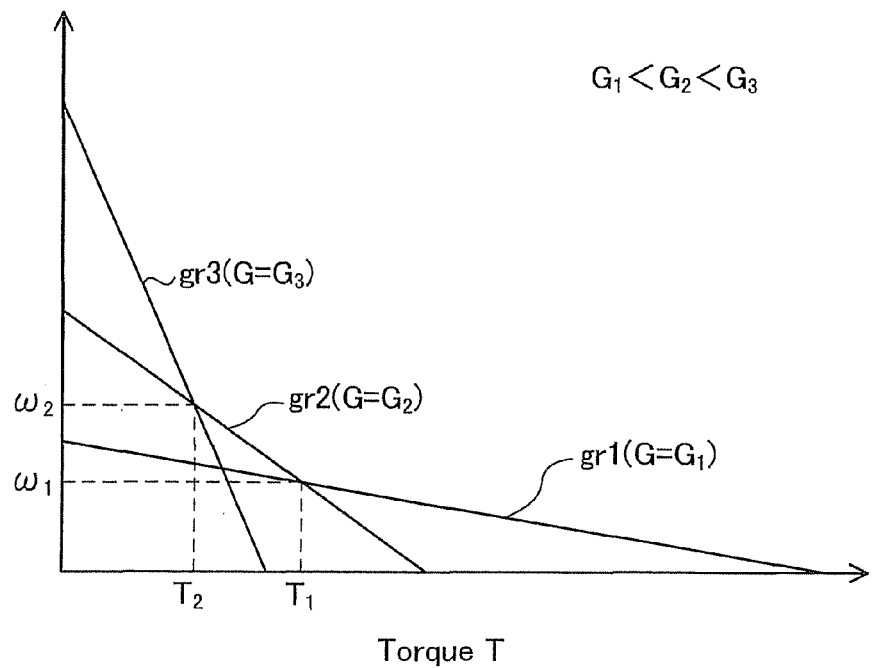
FIG. 10 is a graph showing relations between the torque T and the rotation speed ω of the motor.

FIG. 10 is a graph showing relations between the torque T and the rotation speed ω of the motor. The graph has three curves gr1 ($B=B_1$, $G=G_1$), gr2 ($B=B_2$, $G=G_2$), and gr3 ($B=B_3$, $G=G_3$) corresponding to three different stages of the relative clearance G changed by the clearance control mechanism 15 or three different stages of the magnetic flux density B passing through the electromagnetic coil. The relative clearance G increases in the sequence of $G_1<G_2<G_3$. The magnetic flux density B decreases in the sequence of $B_3<B_2<B_1$ with an increase in relative clearance G. As clearly understood from the graph of FIG. 10, the greater torque T is generated in the motor at the lower rotation speed ω of the motor under the condition of the fixed relative clearance G.

In a range of the rotation speed ω satisfying $0 \leqq \omega \leqq \omega_1$, the relative clearance $G=G_1$ (curve gr1) gives the largest torque T. In a range of the rotation speed ω satisfying $\omega_1<\omega \leqq \omega_2$, the relative clearance $G=G_2$ (curve gr2) gives the largest torque T. In a range of the rotation speed ω satisfying $\omega_2<\omega$, the relative clearance $G=G_3$ (curve gr3) gives the largest torque T.

The clearance control mechanism 15 changes the relative clearance G to vary the torque T generated at the fixed rotation speed ω. The clearance control mechanism 15 enables the relative clearance G to be set according to the rotation speed ω of the motor. The clearance control mechanism 15 changes over the relative clearance G among the three different levels according to the rotation speed ω to maximize the generated torque T over the whole range of the rotation speed ω:

(1) setting the relative clearance G to $G_1$ in the range of $0 \leqq \omega \leqq \omega_1$;

(2) setting the relative clearance G to $G_2$ in the range of $\omega_1<\omega \leqq \omega_2$; and (3) setting the relative clearance G to $G_3$ in the range of $\omega_2<\omega$.

In a range of the torque T satisfying $0 \leqq T \leqq T_2$, the relative clearance $G=G_3$ (curve gr3) gives the highest rotation speed ω in the steady state. In a range of t the torque T satisfying $T_2<T \leqq T_1$, the relative clearance $G=G_2$ (curve gr2) gives the highest rotation speed ω in the steady state. In a range of the torque T satisfying $T_1<T$, the relative clearance $G=G_1$ (curve gr1) gives the highest rotation speed ω in the steady state.

Under application of a fixed load to the motor or under no load condition, the clearance control mechanism 15 changes the relative clearance G to vary the rotation speed ω of the motor in the steady state. The clearance control mechanism 15 changes over the relative clearance G among the three different levels according to the magnitude of the load applied to the motor (that is, the torque T) to maximize the rotation speed ω over the whole range of the torque T:

(1) setting the relative clearance G to $G_3$ in the range of $0 \leqq T \leqq T_2$;

(2) setting the relative clearance G to $G_2$ in the range of $T_2<T \leqq T_1$; and (3) setting the relative clearance G to $G_1$ in the range of $T_1<T$.

In the graph of FIG. 10, the clearance control mechanism 15 changes over the relative clearance G among the three different levels according to the rotation speed ω of the motor or according to the magnitude of the motor load. The relative clearance G may, however, be changed over among any arbitrary number of stages or may be changed continuously according to the rotation speed ω of the motor or according to the magnitude of the motor load. Such arrangement ensures more adequate setting of the relative clearance G to maximize the torque T generated at the rotation speed ω or to maximize the rotation speed ω in the steady state under application of a fixed load to the motor.

In the graph of FIG. 9, the larger relative clearance G gives the higher rotation speed of the motor under no load condition. This is because the interception ($K_4$/B) given as the second term on the right side of Equation (8) increases with an increase in relative clearance G.

Figure 11A:
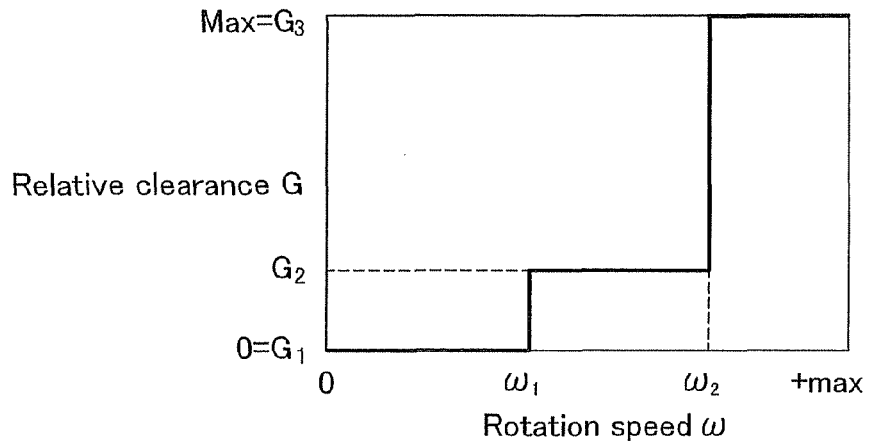
FIGS. 11A-11C are graphs showing examples of controlling the relative clearance G by the clearance control mechanism 15.
Figure 11B:
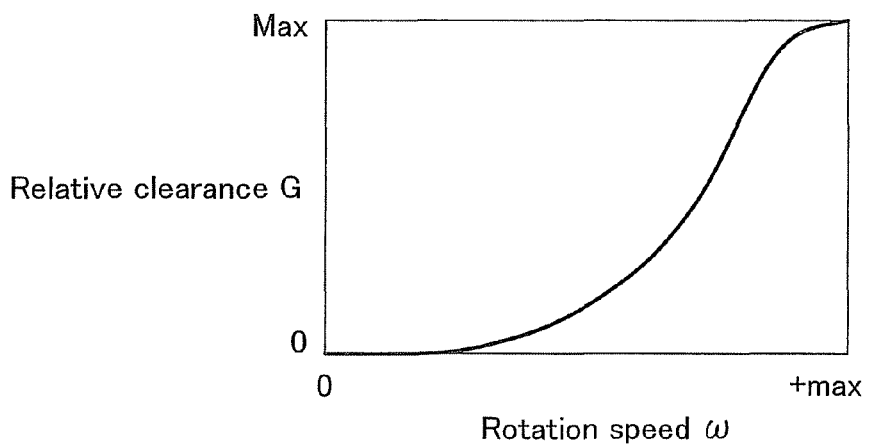
Figure 11C:
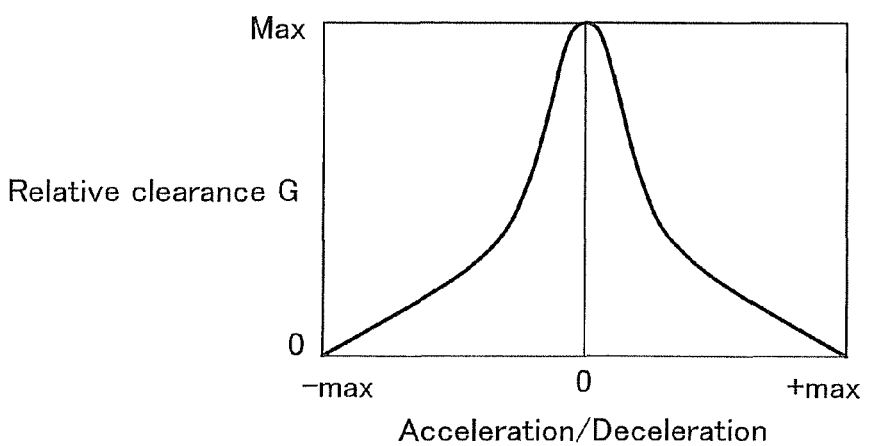

FIGS. 11A-11C are graphs showing examples of controlling the relative clearance G by the clearance control mechanism 15. In the example of FIG. 11A, the clearance control mechanism 15 divides the range of the rotation speed ω into three areas and sets the relative clearance G in each speed area. Setting the relative clearance G in this manner enlarges the torque T generated in each speed area. In the example of FIG. 11B, the clearance control mechanism 15 continuously varies the relative clearance G according to the rotation speed ω to maximize the torque T at each rotation speed ω. In the example of FIG. 11C, the clearance control mechanism 15 continuously varies the relative clearance G according to the acceleration/deceleration of the motor. Controlling the relative clearance G according to any of these methods maximizes the rotation speed ω of the motor in the steady state or maximizes the generated torque T, thus ensuring the highly efficient acceleration/deceleration of the motor.

In the state where the motor is used as a generator to regenerate electric power, controlling the relative clearance G by the clearance control mechanism 15 allows regulation of a braking force generated by the generator. For example, setting the smaller value to the relative clearance G in the power regenerative state gives the greater braking force.

The electromagnetic coil preferably does not have a magnetic inner core (for example, an iron core). In this preferable structure, the absence of the iron core naturally causes no adsorptive power, which is generally produced between the iron core and permanent magnets. The clearance control mechanism 15 thus requires the smaller power to control the relative clearance G, compared with the structure with an iron core. In the structure with an iron core, the available range of the rotation speed by controlling the relative clearance G is up to approximately twice the minimum rotation speed (rotation speed at the relative clearance G=0). In the structure with no iron core, on the other hand, the available range of the rotation speed is over four times the minimum rotation speed. The electromagnetic coil may, however, have a magnetic inner core according to the requirements.

A3. Circuit Structure

Figure 12:
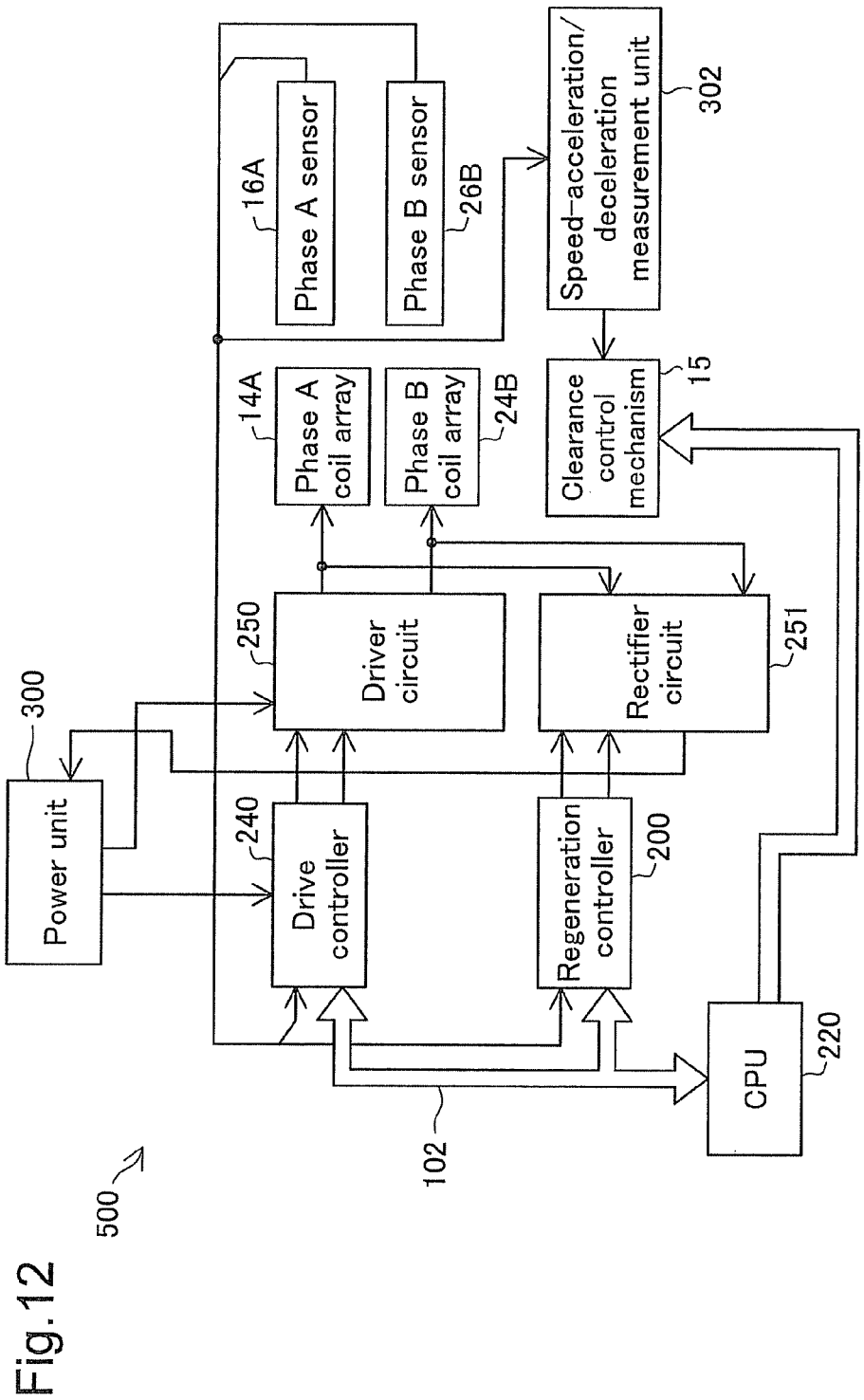
FIG. 12 is a block diagram showing the structure of a circuit unit 500 for an electric motor.

FIG. 12 is a block diagram showing the structure of a circuit unit 500 for an electric motor. The circuit unit 500 includes a CPU 220, a drive controller 240, a regeneration controller 200, a driver circuit 250, a rectifier circuit 251, a power unit 300, a speed-acceleration/deceleration measurement unit 302, and the clearance control mechanism 15. The two controllers 240 and 200 are connected to the CPU 220 via a bus 102. The drive controller 240 and the driver circuit 250 are involved in control of the electric motor to generate a driving force. The regeneration controller 200 and the rectifier circuit 251 are involved in control of the electric motor to regenerate electric power. The regeneration controller 200 and the rectifier circuit 251 are collectively referred to as the 'regenerative circuit'. The drive controller 240 is also referred to as the 'drive signal generation circuit'. The speed-acceleration/deceleration measurement unit 302 receives a sensor output SSA or a sensor output SSB and detects the rotation speed or the acceleration/deceleration of the motor. The frequency of the sensor output SSA or SSB is correlated to the rotation speed of the motor. The speed-acceleration/deceleration measurement unit 302 measures the length of a time period having a positive level of the sensor output SSA with an inner counter or another equivalent element and computes the rotation speed of the motor. The acceleration/deceleration of the motor is then computed from the rotation speed. As mentioned previously, the clearance control mechanism 15 controls the relative clearance G according to the rotation speed or the acceleration/deceleration of the motor. The clearance control mechanism 15 is connected to the CPU 220 to arbitrarily change the control characteristic of the relative clearance G (see FIGS. 11A through 11C). The power unit 300 is used to apply a supply voltage to the other circuits included in the circuit unit 500 of FIG. 12. For the simplicity of illustration, only power lines from the power unit 300 to the drive controller 240 and to the driver circuit 250 are shown in FIG. 12, while power lines to the other circuits are omitted.

Figure 13:
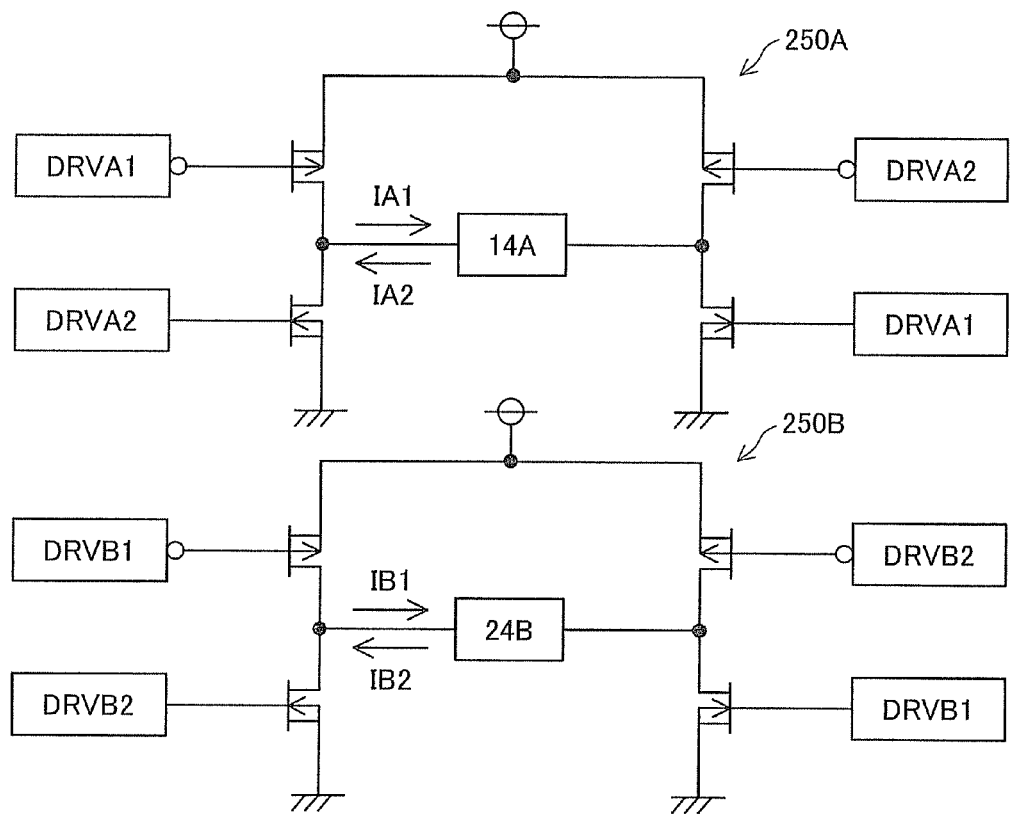
FIG. 13 is a diagram depicting the internal configuration of the driver circuit 250.

FIG. 13 is a diagram depicting the internal configuration of the driver circuit 250. The Phase A driver circuit 250A is a H-bridge circuit which drives the Phase A coil array 14A in response to AC drive signals DRVA1, DRVA2. The white circles at the terminal part of the blocks depicting the drive signals indicate negative logic, with the signal being inverted. The arrows labeled IA1, IA2 respectively indicate direction of current flow by the drive signals DRVA1, DRVA2. The configuration of the Phase B driver circuit 250B is the same as that of the Phase A driver circuit 250A; flow of current IB1, IB2 by drive signals DRVB1, DRVB2 is shown.

FIGS. 14A to 14E show the internal configuration and operation of the drive controller 240 (FIG. 12A). The drive controller 240 has a basic clock generating circuit 510, a 1/N frequency divider 520, a PWM unit 530, a moving direction register 540, multipliers 550, 552, encoders 560, 562, AD converters 570, 572, a voltage control value register 580, and an excitation interval setting unit 590.

The basic clock generating circuit 510 is a circuit that generates a clock signal PCL of prescribed frequency, and is composed of a PLL circuit, for example. The frequency divider 520 generates a clock signal SDC of a frequency which is 1/N the frequency of the clock signal PCL. The value of N is set to a prescribed constant. This value of N has been previously established in the frequency divider 520 by the CPU 220 (FIG. 7A). The PWM unit 530 generates AC drive signals DRVA1, DRVA2, DRVB1, DRVB2 (FIG. 13) in response to the clock signals PCL, SDC, multiplication values supplied by the multipliers 550, 552, a moving direction value RI supplied by the moving direction value register 540, positive/negative sign signals Pa, Pb supplied by the encoders 560, 562, and excitation interval signals Ea, Eb supplied by the excitation interval setting unit 590. This operation will be discussed later.

A value RI indicating the direction of rotation of the motor is established in the moving direction value register 540 by the CPU 220. In the present embodiment, the motor undergoes forward rotation when the moving direction value RI is L level, and reverse rotation when it is H level.

The other signals Ma, Mb, Pa, Pb, Ea, Eb presented to the PWM unit 530 are determined in the manner described below. The multiplier 550, the encoder 560, and the AD converter 570 are circuits for use in Phase A; the multiplier 552, the encoder 562, and the AD converter 572 are circuits for use in Phase B. Since these circuit groups have identical operation, the discussion hereinbelow will mainly focus on operation of the Phase A circuits.

The magnetic sensor output SSA is presented to the AD converter 570. This sensor output SSA has a range, for example, of from GND (ground potential) to VDD (power supply voltage), with the middle point (=VDD/2) being the middle point of the output waveform (the point at which the sine wave passes through the origin). The AD converter 570 performs AD conversion of this sensor output SSA to generate a digital value of sensor output. The output of the AD converter 570 has a range, for example, of FFh to 0h (the "h" suffix denotes hexadecimal), with the median value of 80h corresponding to the middle point of the output waveform.

The encoder 560 converts the range of the sensor output value subsequent to AD conversion, and sets the value of the middle point of the output waveform to 0. As a result, the sensor output value Xa generated by the encoder 560 assumes a prescribed range on the positive side (e.g. +127 to +0) and a prescribed range on the negative side (e.g. –0 to –127). However, the value presented by the encoder 560 to the multiplier 560 is the absolute value of the sensor output value Xa; the positive/negative sign thereof is presented to the PWM unit 530 as the positive/negative sign signal Pa.

The voltage control value register 580 stores a voltage control value Ya established by the CPU 220. This voltage control value Ya, together with the excitation interval signal Ea discussed later, functions as a value for setting application voltage of the motor; the value Ya can take a value of 0 to 1.0, for example. Assuming an instance where the excitation interval signal Ea has been set in such a way that all intervals are excitation intervals, with no non-excitation intervals being provided, Ya=0 will mean that the application voltage is zero, and Ya=1.0 will mean that the application voltage is the maximum value. The multiplier 550 performs multiplication of the voltage control value Ya and the sensor output value Xa output from the encoder 560 and conversion to an integer; the multiplication value Ma thereof is presented to the PWM unit 530.

FIGS. 14B to 14E depict operation of the PWM unit 530 in instances where the multiplication value Ma takes various different values. Here, it is assumed that all intervals are excitation intervals, with no non-excitation intervals. The PWM unit 530 is a circuit that, during each cycle of the clock signal SDC, generates one pulse with a duty factor of Ma/N. Specifically, as shown in FIGS. 14B to 14E, in association with increase of the multiplication value Ma, the pulse duty factor of the drive signals DRVA1, DRVA2 increases as well. The first drive signal DRVA1 is a signal that generates a pulse only when the sensor output SSA is positive, and the second drive signal DRVA2 is a signal that generates a pulse only when the sensor output SSA is negative; in FIGS. 14B to 14E, these are shown together. For convenience, the second drive signal DRVA2 is shown as negative pulses.

FIGS. 15A to 15D depict correspondence relationships between sensor output waveforms and waveforms of drive signals generated by the PWM unit 530. In the drawing, "Hiz" denotes high impedance. As explained in FIGS. 14A to 14E, the Phase A drive signals DRVA1, DRVA2 are generated by PWM control using the analog waveform of the Phase A sensor output as-is. This is true for the Phase B drive signals DRVB1, DRVB2 as well. Consequently, it is possible for the Phase A coils and Phase B coil to be presented with effective voltage that exhibits change in level corresponding to change in the sensor outputs SSA, SSB.

The PWM unit 530 is furthermore designed so that a drive signal is output during excitation intervals that are indicated by the excitation interval signals Ea, Eb supplied by the excitation interval setting unit 590, and so that no drive signal is output during intervals other than the excitation intervals (non-excitation intervals). FIGS. 15E and 15F depict drive signal waveforms produced in the case where excitation intervals EP and non-excitation intervals NEP have been established by the excitation interval signals Ea, Eb. In the excitation intervals EP, the drive signal pulses of FIGS. 15C and 15D are generated as is; in the non-excitation intervals NEP, no pulses are generated. By establishing excitation intervals EP and non-excitation intervals NEP in this way, there is no application of voltage to the coils in proximity to the middle points of the back electromotive force waveform (i.e. in proximity to the middle points of sensor output), thus making possible further improvement of motor efficiency. In preferred practice excitation intervals EP will be established in intervals that are symmetric about the peaks of the back electromotive force waveform (the induced voltage waveform), and the non-excitation intervals NEP will be established in intervals that are symmetric about the middle points of the back electromotive force waveform.

As discussed previously, if the voltage control value Ya is set to a value less than 1, the multiplication value Ma will be small compared with the voltage control value Ya. Consequently, effective adjustment of application voltage through the voltage control value Ya is possible as well.

As will be understood from the preceding discussion, with the motor of the present embodiment, it is possible to adjust the application voltage using both the voltage control value Ya and the excitation interval signal Ea. This is true for Phase B as well. In preferred practice, relationships between the preferred application voltage on the one hand, and the voltage control value Ya and the excitation interval signal Ea on the other, will be stored in advance in table format in memory in the circuit unit 500. By so doing it is possible, when the circuit unit 500 has received the preferred application voltage from the outside, for the CPU 220 in response to the drive signal to set the voltage control value Ya and the excitation interval signal Ea in the drive controller 240. Adjustment of application voltage does not require the use of both the voltage control value Ya and the excitation interval signal Ea, and it would be acceptable to use either of these instead.

Figure 16:
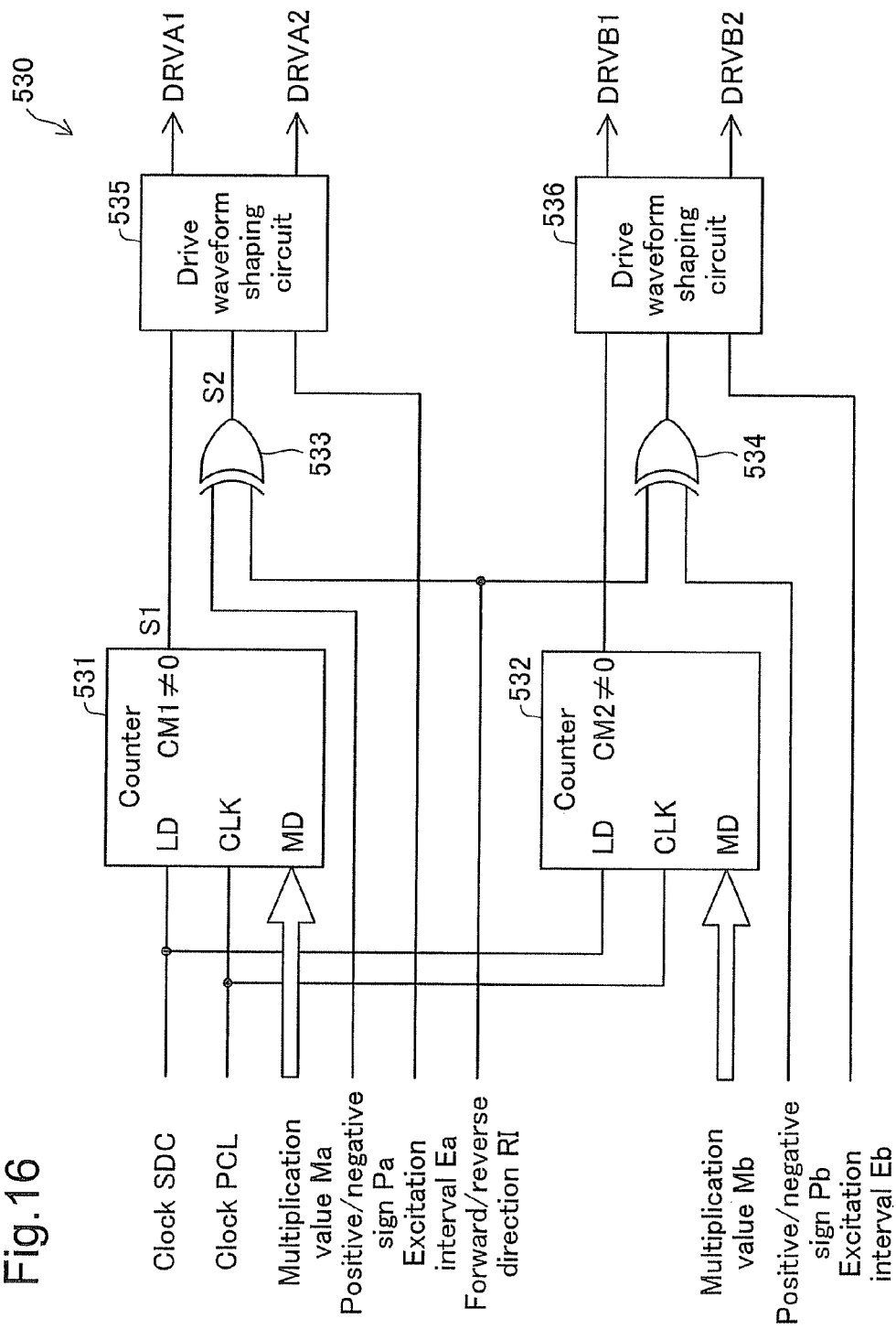
FIG. 16 is a block diagram depicting the internal configuration of the PWM unit 530.

FIG. 16 is a block diagram depicting the internal configuration of the PWM unit 530 (FIG. 14A). The PWM unit 530 has counters 531, 532, EXOR circuits 533, 534, and drive waveform shaping units 535, 536. The counter 531, the EXOR circuit 533, and the drive waveform shaping unit 535 are circuits used for Phase A; the counter 532, the EXOR circuit 534, and the drive waveform shaping unit 536 are circuits used for Phase B. Their operation will be described below.

Figure 17:
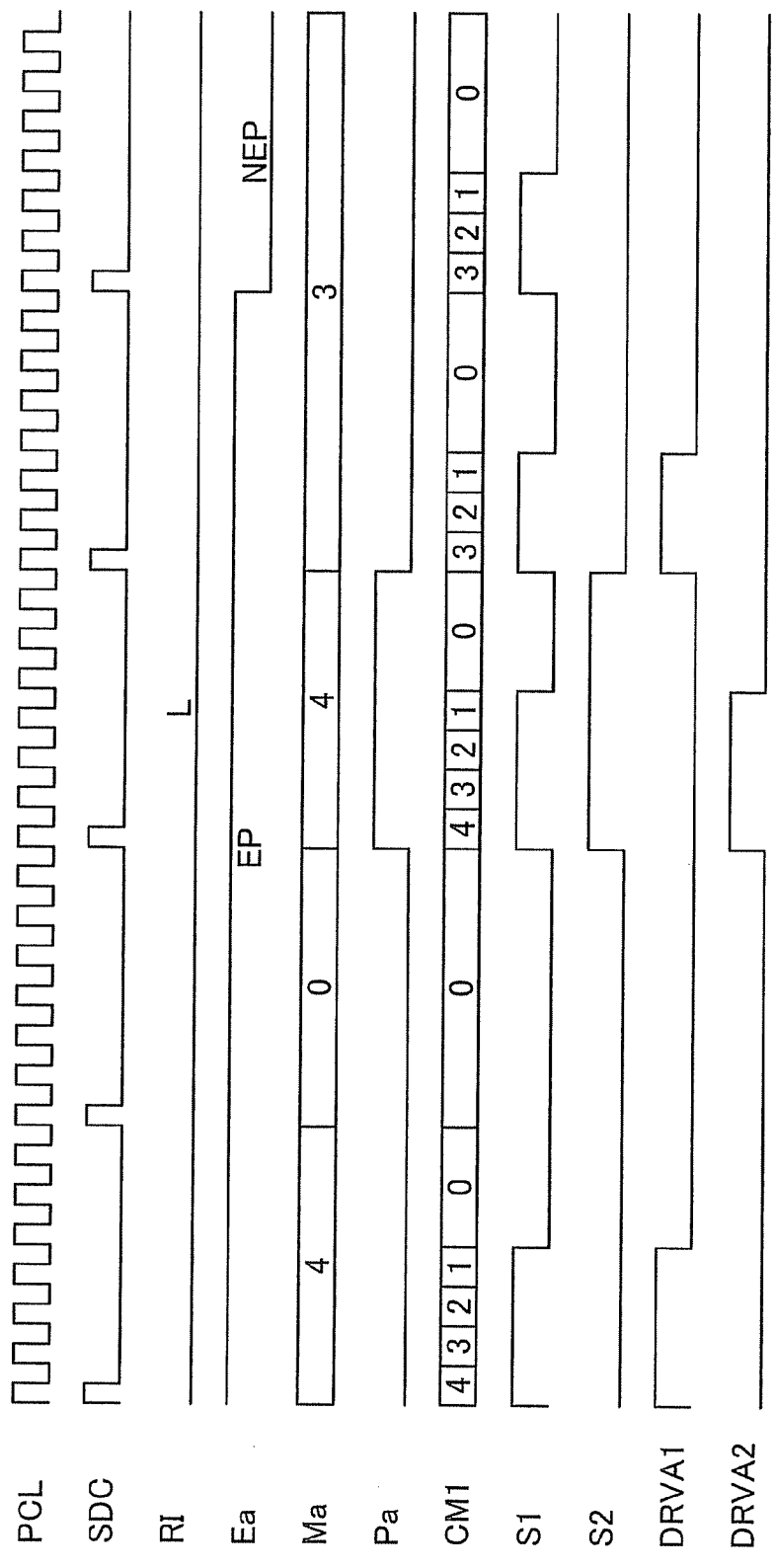
FIG. 17 is a timing chart depicting operation of the PWM unit 530 during forward rotation of the motor.

FIG. 17 is a timing chart depicting operation of the PWM unit 530 during forward rotation of the motor. There are shown the two clock signals PCL and SDC, the moving direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping unit 535. For each cycle of the clock signal SDC, the counter 531 repeats an operation decrementing the count value CM1 to 0 in sync with the clock signal PCL. The initial value of the count value CM1 is set to the multiplication value Ma. In FIG. 17, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 representing exclusive OR of the positive/negative sign signal Pa and the moving direction value RI. When the motor is running forward, the moving direction value RI is L level. Consequently, the output S2 of the EXOR circuit 533 will be a signal identical to the positive/negative sign signal Pa. The drive waveform shaping unit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is L level is output as the drive signal DRVA1, and the signal during intervals in which the output S2 of the EXOR circuit 533 is H level is output as the drive signal DRVA2. The excitation interval signal Ea falls to L level in proximity to the right end in FIG. 13, thereby setting up a non-excitation interval NEP. Consequently, neither of the drive signals DRVA1, DRVA2 is output during this non-excitation interval NEP, and a state of high impedance is maintained.

Figure 18:
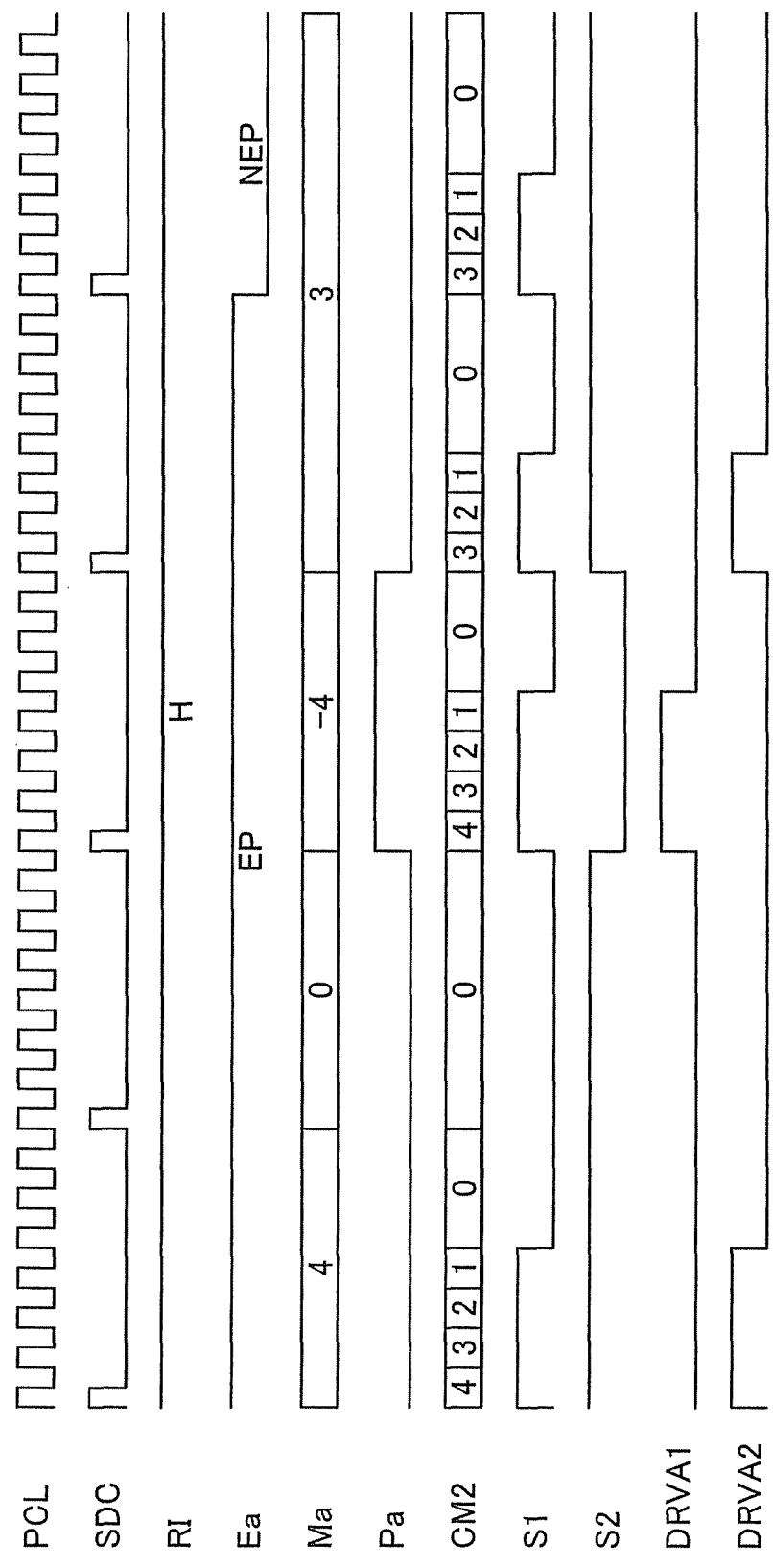
FIG. 18 is a timing chart depicting operation of the PWM unit 530 during reverse rotation of the motor.

FIG. 18 is a timing chart depicting operation of the PWM unit 530 during reverse rotation of the motor. When the motor is running in reverse, the moving direction value RI is H level. As a result, the two drive signals DRVA1, DRVA2 switch position with those in FIG. 17, and it will be appreciated that the motor runs in reverse as a result. The Phase B circuits 532, 534, 536 of the PWM unit 530 operate the same as those discussed above.

Figure 19A:
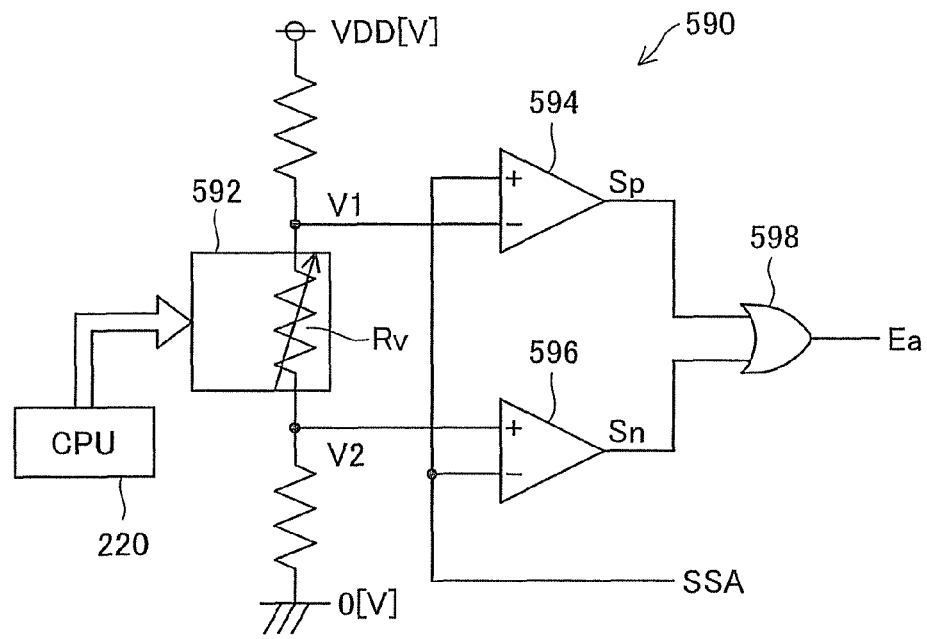
FIGS. 19A and 19B show the internal configuration and operation of the excitation interval setting unit 590.
Figure 19B:
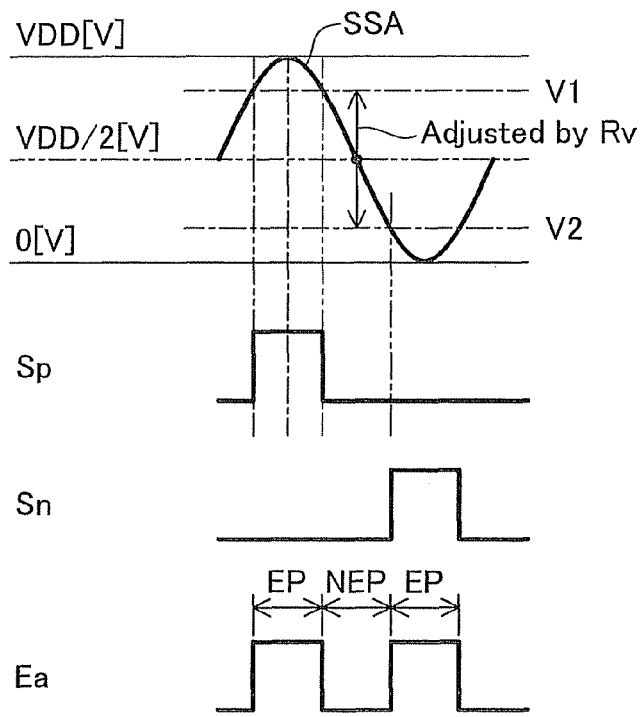

FIGS. 19A and 19B show the internal configuration and operation of the excitation interval setting unit 590. The excitation interval setting unit 590 has an electronic variable resistor 592, voltage comparators 594, 596, and an OR circuit 598. The resistance Rv of the electronic variable resistor 592 is set by the CPU 220. The voltages V1, V2 at the two terminals of the electronic variable resistor 592 are presented to one input terminal of each of the voltage comparators 594, 596. The sensor output SSA is presented to the other input terminal of the voltage comparators 594, 596. In FIG. 19A, for convenience the Phase B circuits have been eliminated from the illustration. The output signals Sp, Sn of the voltage comparators 594, 596 are input to the OR circuit 598. The output of the OR circuit 598 is the excitation interval signal Ea, used for distinguishing excitation intervals from non-excitation intervals.

FIG. 19B depicts operation of the excitation interval setting unit 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal assuming the logical sum of the these output signals Sp, Sn. Consequently, as shown at bottom in FIG. 19B, the excitation interval signal Ea can be used as a signal indicating excitation intervals EP and non-excitation intervals NEP. The excitation intervals EP and non-excitation intervals NEP are established by means of adjustment of the variable resistance Rv by the CPU 220.

Figure 20:
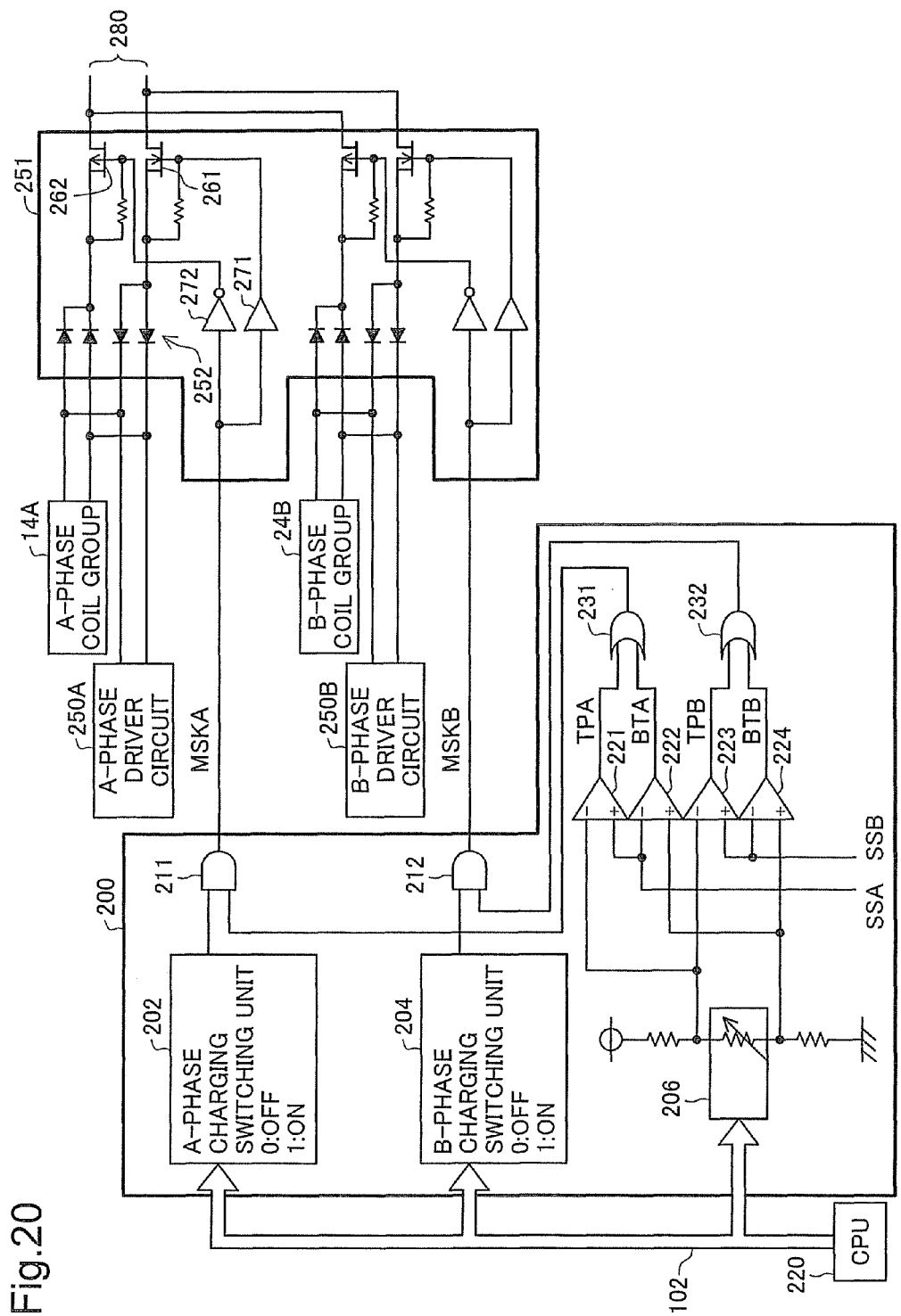
FIG. 20 illustrates the internal configuration of the regeneration controller 200 and rectifier circuit 251.

FIG. 20 illustrates the internal configuration of the regeneration controller 200 and rectifier circuit 251 shown in FIG. 12. The regeneration controller 200 comprises an phase A charge switching unit 202 and a phase B charge switching unit 204, both connected to the bus 102, and an electronically variable resistor 206. The output signals of the two charge switching units 202, 204 are applied to the input terminals of the two AND circuits 211, 212.

The phase A charge switching unit 202 outputs a signal of a "1" level when the regenerative power from the phase A coils 14A is recovered, and outputs a signal of a "0" level when the power is not recovered. The same is true for the phase B charge switching unit 204. The switching of those signal levels is conducted with the CPU 110. The presence or absence of regeneration from the phase A coils 14A and the presence or absence of regeneration from the phase B coil 24B can be set independently. Therefore, for example, electric power can be regenerated from the phase B coils 24B, while generating a drive force in the motor by using the phase A coils 14A.

The drive controller 240 shown in FIG. 12, similarly, may have a configuration such that whether or not the drive force is generated by using the phase A coils 14A and whether or not the drive force is generated by using the phase B coils 24B can be set independently. In such a case, the motor can be operated in an operation mode such that a drive force is generated in any one of the two sets of coils 14A, 24B, while electric power is regenerated in the other coils.

The voltage across the electronically variable resistor 206 is applied to one of the two input terminals of the four voltage comparators 221-224. The phase A sensor signal SSA and phase B sensor signal SSB are applied to the other input terminal of the voltage comparators 221-224. The output signals TPA, BTA, TPB, BTB of the four voltage comparators 221-224 can be called "mask signals" or "permission signals".

The mask signals TPA, BTA for the phase A coils are inputted into the OR circuit 231, and the mask signals TPB, BTB for the phase B are inputted into the other OR circuit 232. The outputs of those OR circuits 231, 232 are supplied to the input terminals of the above-mentioned two AND circuits 211, 212. The output signals MSKA, MSKB of those AND circuits 211, 212 are called "mask signals" or "permission signals".

The configurations of the four voltage comparators 221-224 and the two OR circuits 231, 232 are identical to two sets of the voltage comparators 594, 596, and the OR circuit 598 of the excitation interval setting unit 590 shown in FIG. 19A. Therefore, the output signal of the OR circuit 231 for the phase A coils is similar to the excitation interval signal Ea shown in FIG. 19B. Further, when the output signal of the phase A charge switching unit 202 is at a "1" level, the mask signal MSKA outputted from the AND circuit 211 for the phase A coils is identical to the output signal of the OR circuit 231. Those operations are identical to those relating to the phase B.

The rectifier circuit 251 has the circuitry for the phase A coils which includes a full-wave rectifier circuit 252 comprising a plurality of diodes, two gate transistors 261, 262, a buffer circuit 271, and an inverter circuit 272 (NOT circuit). The identical circuitry is also provided for the phase B. The gate transistors 261, 262 are connected to the power wiring 280 for regeneration. It is preferable to use Schottky diodes which have excellent characteristics of low Vf as the plurality of diodes.

During power regeneration, the AC power generated in the phase A coils 14A is rectified with the full-wave rectifier circuit 252. The mask signal MSKA for the phase A coils and the inverted signal thereof are supplied to the gates of the gate transistors 261, 262, and the gate transistors 261, 262 are ON/OFF controlled accordingly. Therefore, within a period in which at least one of the mask signals TPA, BTA outputted from the voltage comparators 221, 222 is at an H level, the regenerated power is outputted to the power source wiring 280. On the other hand, within an interval in which both mask signals TPA, BTA are at an L level, power regeneration is inhibited.

As clearly follows from the explanation provided hereinabove, the regenerated power can be recovered by using the regeneration controller 200 and the rectifier circuit 251. Furthermore, the regeneration controller 200 and the rectifier circuit 251 can restrict the interval in which the regenerated power from the phase A coils 14A and phase B coils 24B is recovered, according to the mask signal MSKA for the phase A coils and the mask signal MSKB for the phase B coils, thereby making it possible to adjust the quantity of the regenerated power.

As discussed above, the structure of the first embodiment changes the relative clearance G formed between the stators 10 and the rotor 30. This arrangement enables a change in torque or a change in rotation speed of the electric motor device by the different technique from the conventional technique of varying the applied voltage.

The clearance control mechanism 15 (FIG. 1) in the structure of the embodiment is equivalent to the 'clearance controller' of the invention. The rotor 30 and the stator 10 in the structure of the embodiment are respectively equivalent to the 'first drive member' and the 'second drive member' of the invention.

B. Second Embodiment

Figure 21A:
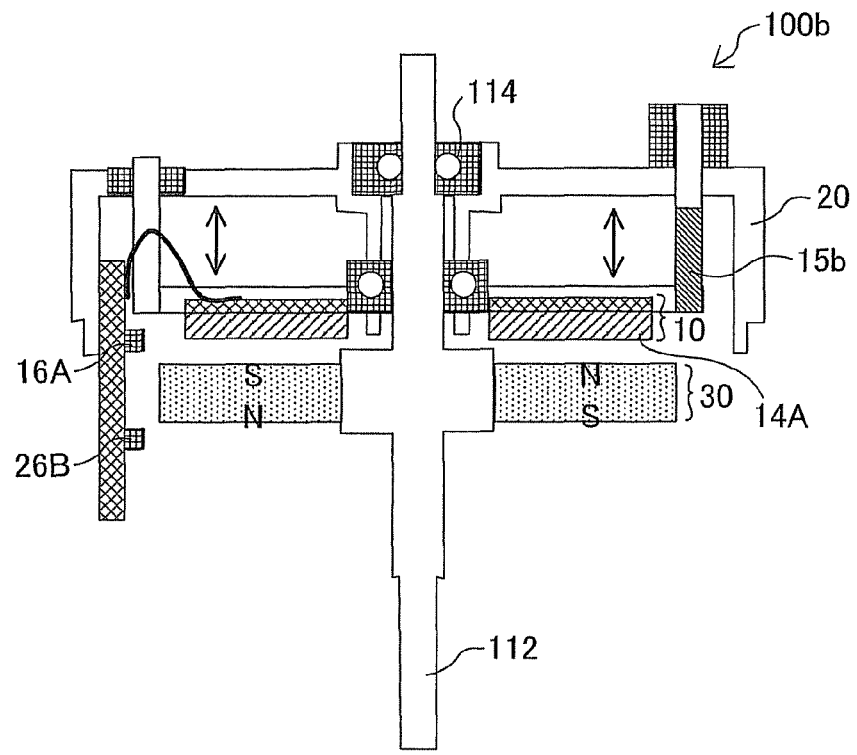
FIGS. 21A and 21B show the schematic structure of a motor main body 100b in a second embodiment of the invention.
Figure 21B:
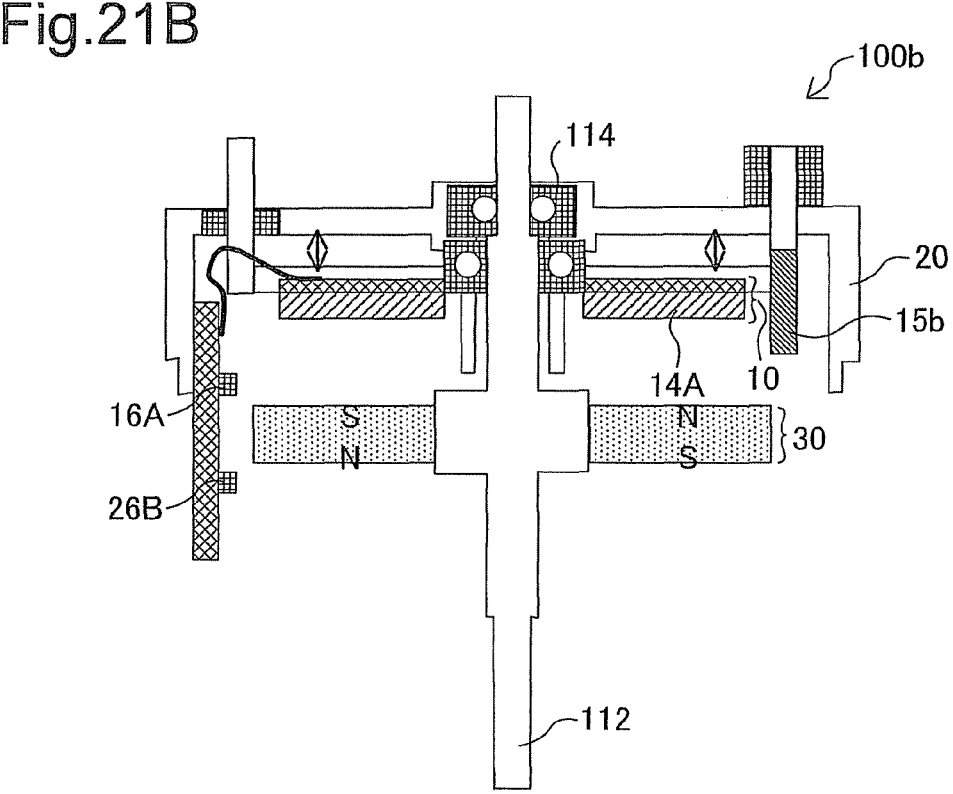

FIGS. 21A and 21B show the schematic structure of a motor main body 100b in a second embodiment of the invention. The structure of the motor main body 100b of the second embodiment is similar to the structure of the motor main body 100 of the first embodiment shown in FIG. 1, except the structure of a clearance control mechanism 15b. For convenience of explanation, a lower portion (phase B portion) of the motor main body 100b is omitted from the illustration of FIGS. 21A and 21B.

FIG. 21A shows a state before shifting the stator 10 by the clearance control mechanism 15b, and FIG. 21B shows a state after shifting the stator 10 by the clearance control mechanism 15b. The clearance control mechanism 15b is coupled with the outer circumference of the stator 10 to shift the stator 10 in the vertical direction as in the structure of the first embodiment.

Figure 22A:
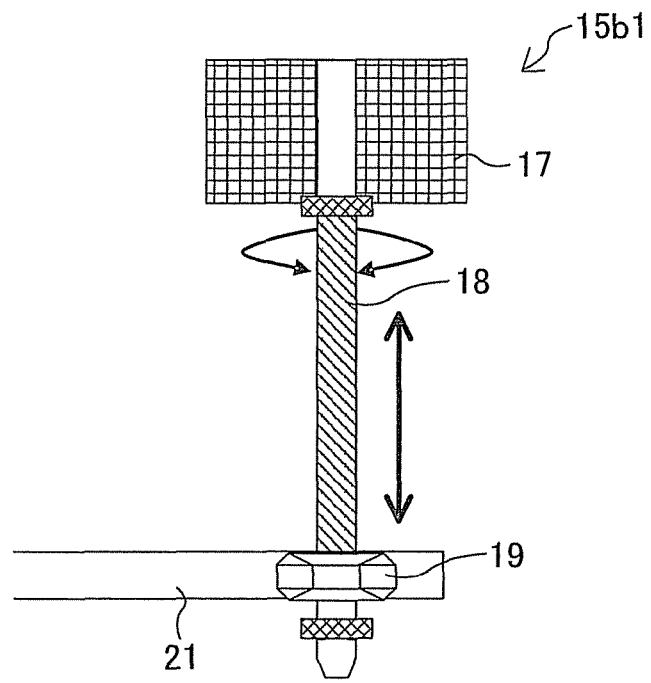
FIG. 22A shows a clearance control mechanism 15b1 as one structure of the clearance control mechanism 15b in the second embodiment.

FIG. 22A shows a clearance control mechanism 15b1 as one structure of the clearance control mechanism 15b in the second embodiment. The clearance control mechanism 15b1 has a rotary motor 17, a rotating member 18, a movable nut 19, and a movable assembly 21. The rotary motor 17 rotates the rotating member 18 to shift the movable nut 19 and the movable assembly 21 in the vertical direction. Although not being specifically illustrated in FIG. 22A and FIG. 22B discussed below, the movable assembly 21 has the coil array 14A shown in FIG. 21A and FIG. 21B.

Figure 22B:
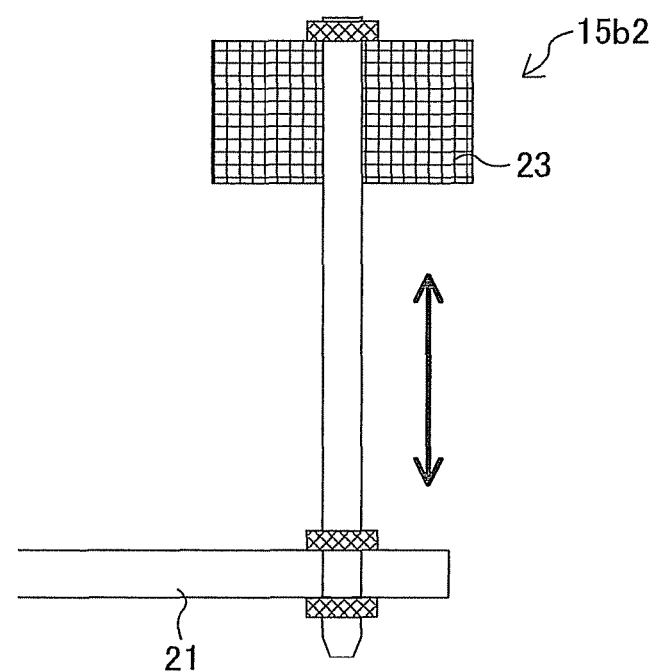
FIG. 22B shows a clearance control mechanism 15b2 as another structure of the clearance control mechanism 15b in the second embodiment.

FIG. 22B shows a clearance control mechanism 15b2 as another structure of the clearance control mechanism 15b in the second embodiment. The clearance control mechanism 15b2 has a voice coil motor 23 and the movable assembly 21. The voice coil motor 23 also works to shift the movable assembly 21 equipped with the coil array 14A in the vertical direction.

These structures of the clearance control mechanism 15b enable a change in torque or a change in rotation speed of the electric motor device by the different technique from the conventional technique of varying the applied voltage, like the structure of the first embodiment.

C. Third Embodiment

Figure 23A:
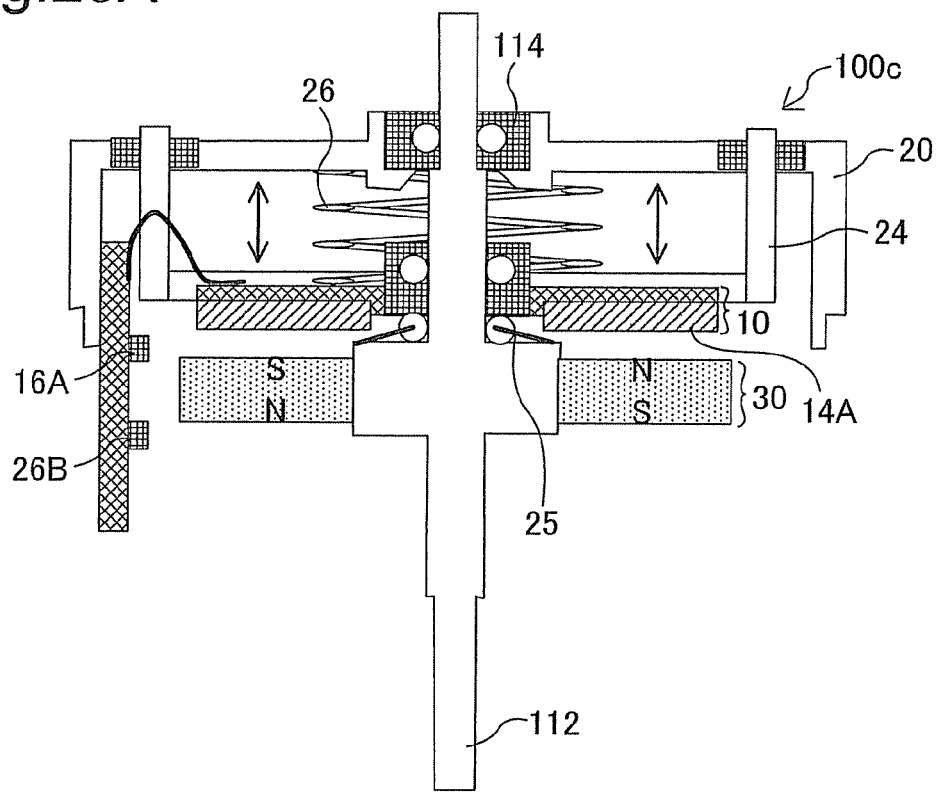
FIGS. 23A and 23B show the schematic structure of a motor main body 100c in a third embodiment of the invention.
Figure 23B:
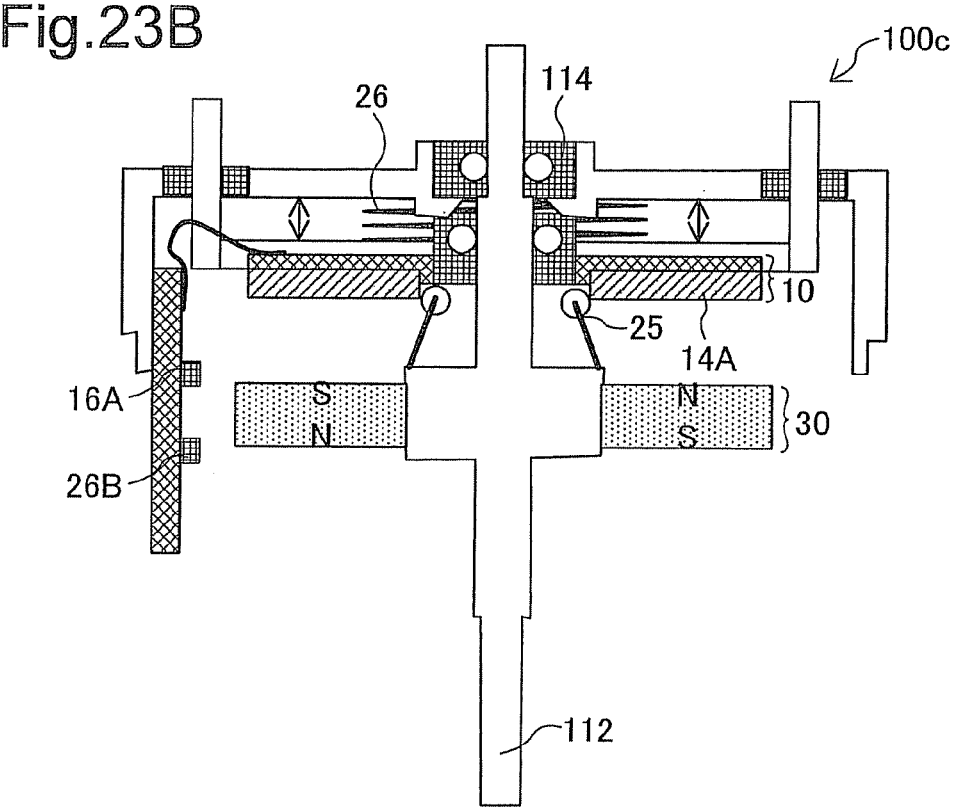

FIGS. 23A and 23B show the schematic structure of a motor main body 100c in a third embodiment of the invention. The motor main body 100c has an inertial mechanism 25 provided between the stator 10 and the rotor 30. The stator 10 is movable along a guide 24 in the vertical direction. The inertial mechanism 25 rotates with the rotation of the rotor 30 and presses up the stator 10 by utilizing the centrifugal force generated corresponding to the rotation speed of the rotor 30.

The lower rotation speed of the rotor 30 decreases the press-up force of the inertial mechanism 25 applied to the rotor 30 and allows the stator 10 to be returned to its original position by the force of a spring 26.

Application of the inertial mechanism 25 taking advantage of the centrifugal force to shift the stator 10 enables a change in torque or a change in rotation speed of the electric motor device by the different technique from the conventional technique of varying the applied voltage, like the structure of the first embodiment. The inertial mechanism 25 in the structure of the embodiment is equivalent to the 'clearance controller' of the invention.

D. Fourth Embodiment

Figure 24A:
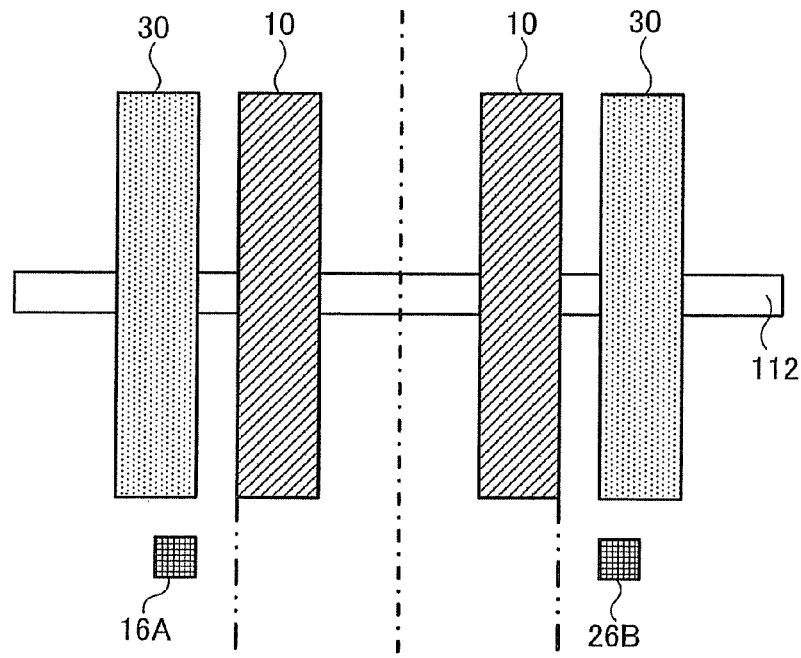
FIGS. 24A and 24B show the positional relations between stators 10 and rotors 30 in a fourth embodiment of the invention.
Figure 24B:
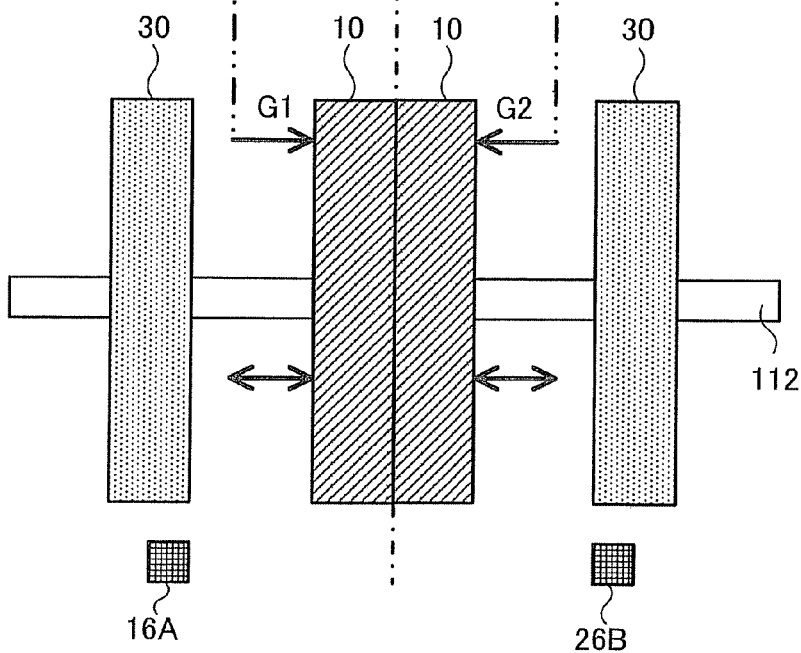

FIGS. 24A and 24B show the positional relations between stators 10 and rotors 30 in a fourth embodiment of the invention. For convenience of explanation, only the stators 10, the rotors 30, a rotating shaft 112, and two magnetic sensors 16A and 26B are shown in FIG. 24A and FIG. 24B, while the other components of the motor are omitted from the illustration.

In the structure of the fourth embodiment, two stators 10 are arranged between two rotors 30. Namely the two rotors 30 are arranged across the two stators 10. The two stators 10 are movable between the two rotors 30 to change the sizes of clearances G1 and G2 formed between the respective pairs of the stator 10 and the rotor 30. Any of the clearance control mechanisms discussed above in the first through the third embodiments is applicable as the mechanism of shifting the stators 10. The two magnetic sensors 16A and 26B are preferably mounted on the casing 20 as shown in FIG. 1, but may be provided on the respective stators 10 according to the requirements.

The structure having the two stators 10 arranged between the two rotors 30 enables a change in torque or a change in rotation speed of the electric motor device by the different technique from the conventional technique of varying the applied voltage, like the structure of the first embodiment.

E. Modified Examples

The present invention is not limited to the embodiments described hereinabove, and may be reduced to practice in various other ways without departing from the spirit thereof. Modifications such as the following are possible, for example.

E1. Modified Example 1

The present invention is applicable to various kinds of devices. For example, the present invention is implemented in a motor in any of various devices such as fan motors, clocks (for driving the hands), drum type washing machines (single rotation), jet coasters, vibrating motors, and the like. Where the present invention is implemented in a fan motor, the various advantages mentioned previously (low power consumption, low vibration, low noise, minimal rotation irregularity, low heat emission, and long life) is particularly notable. Such fan motors can be employed, for example, as fan motors for various devices such as digital display devices, vehicle on-board devices, fuel cell type PCs, fuel cell type digital cameras, fuel cell type video cameras, fuel cell type mobile phones, various other fuel cell-powered devices, and projectors. The motor of the present invention may also be utilized as a motor for various types of household electric appliances and electronic devices. For example, a motor in accordance with the present invention may be employed as a spindle motor in an optical storage device, magnetic storage device, polygon mirror drive, or the like. The motor of the present invention may also be utilized as a motor for a movable body or a robot.

Figure 25:
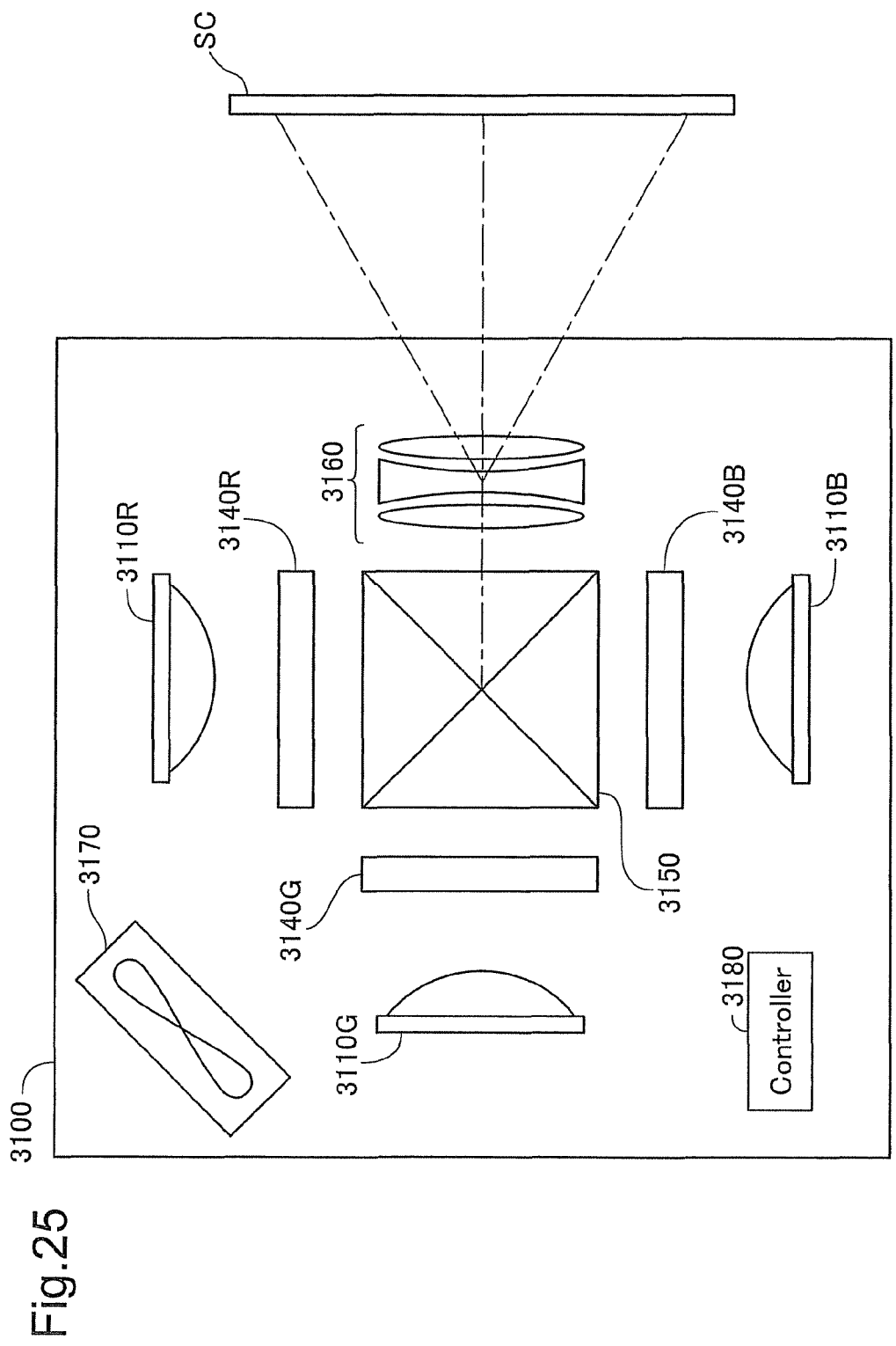
FIG. 25 is an illustration depicting a projector which utilizes a motor equipped with an information processing apparatus according to the present invention.

FIG. 25 is an illustration depicting a projector which utilizes a motor equipped with an information processing apparatus according to the present invention. This projector 3100 has three light sources 3110R, 3110G, 3110B for emitting light of the three colors red, green, and blue; liquid crystal light valves 3140R, 3140G, 3140B for modulating light of the three colors; a cross dichroic prism 3150 for synthesizing modulated light of the three colors; a projection lens system 3160 for projecting light synthesized from the three colors onto a screen SC; a cooling fan 3170 for cooling the interior of the projector; and a controller 3180 for controlling the entire projector 3100. Any of the various brushless motors described above may be used as the motor for driving the cooling fan 3170.

Figure 26A:
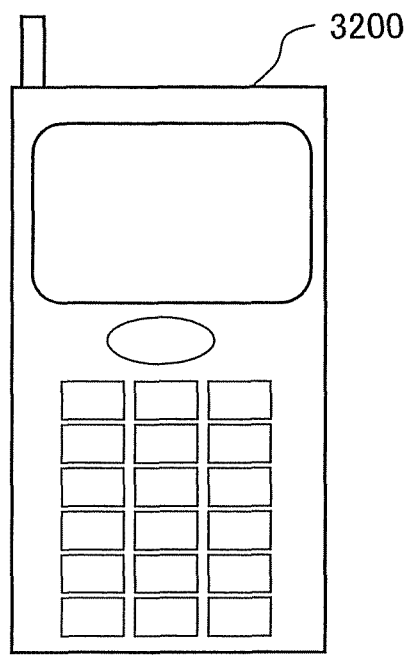
FIGS. 26A to 26C illustrate a fuel cell type mobile phone which utilizes a motor equipped with an information processing apparatus according to the present invention.
Figure 26B:
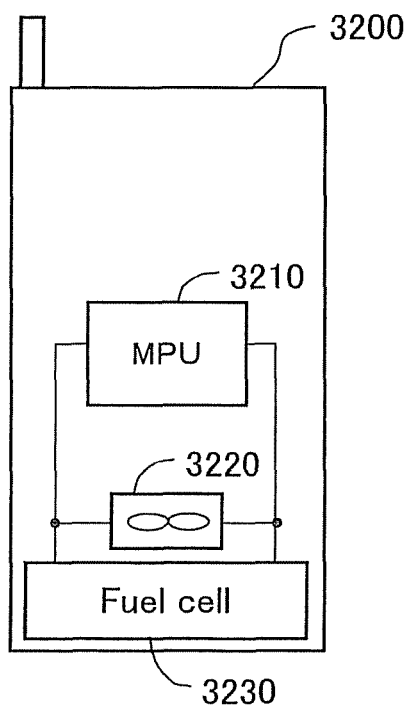
Figure 26C:
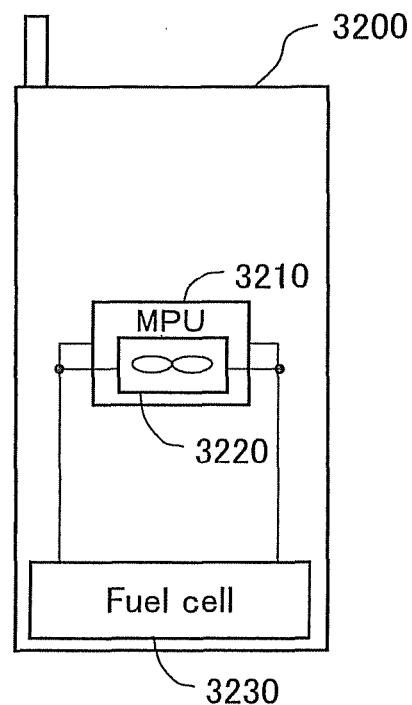

FIGS. 26A to 26C illustrate a fuel cell type mobile phone which utilizes a motor equipped with an information processing apparatus according to the present invention. FIG. 26A shows an exterior view of a mobile phone 3200, and FIG. 26B shows an example of internal configuration. The mobile phone 3200 includes an MPU 3210 for controlling operation of the mobile phone 3200; a fan 3220; and a fuel cell 3230. The fuel cell 3230 supplies power to the MPU 3210 and to the fan 3220. The fan 3220 blows air into the mobile phone 3200 from the outside in order to supply air to the fuel cell 3230, or in order to expel moisture evolved in the fuel cell 3230 from the inside of the mobile phone 3200 to the outside. The fan 3220 may also be positioned on the MPU 3210 as shown in FIG. 26C, to cool the MPU 3210. Any of the various brushless motors described above can be used as the motor for driving the fan 3220.

Figure 27:
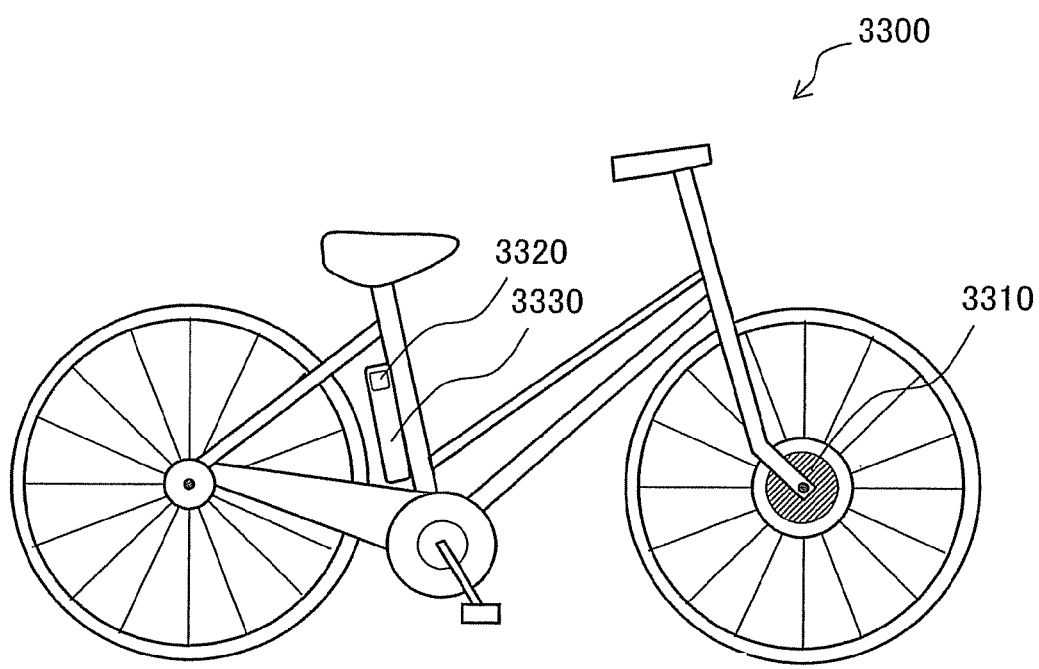
FIG. 27 is an illustration depicting an electrically powered bicycle (power assisted bicycle) as one example of a movable body that utilizes a motor/generator equipped with an information processing apparatus according to the embodiments of the present invention.

FIG. 27 is an illustration depicting an electrically powered bicycle (power assisted bicycle) as one example of a movable body that utilizes a motor/generator equipped with an information processing apparatus according to the embodiments of the present invention. This bicycle 3300 is provided with a motor 3310 on its front wheel; and with a control circuit 3320 and a rechargeable battery 3330 disposed on the frame below the saddle. The motor 3310 uses power from the rechargeable battery 3330 to drive the front wheel, thereby assisting travel. During braking, regenerative power from the motor 3310 is used to charge the rechargeable battery 3330. The control circuit 3320 is a circuit for controlling driving and regeneration of the motor. Any of the various brushless motors described above can be used as the motor 3310.

Figure 28:
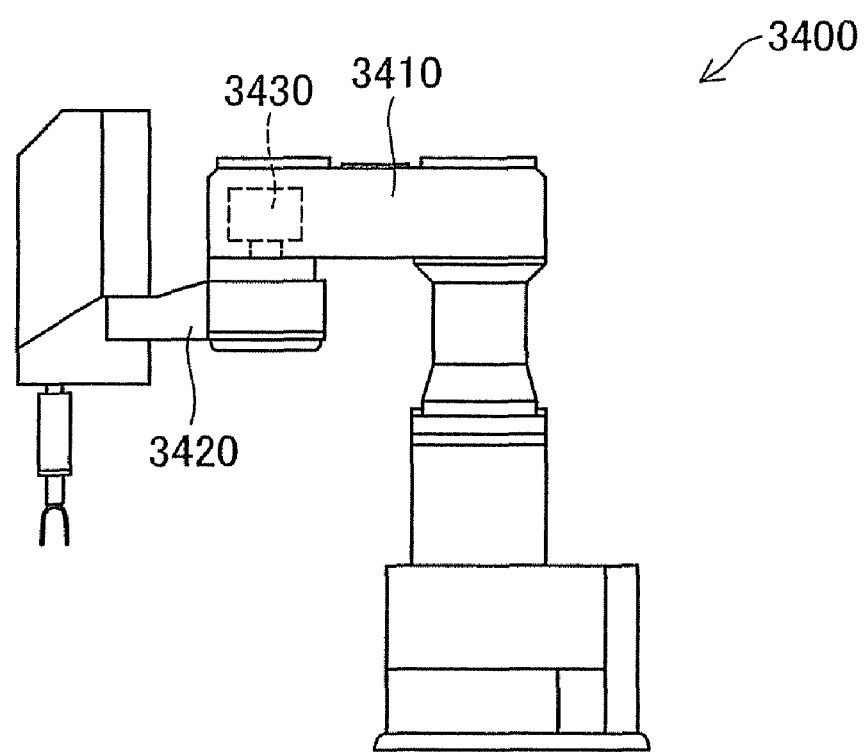
FIG. 28 is an illustration showing an example of a robot which utilizes a motor equipped with an information processing apparatus according to the embodiments of the present invention.

FIG. 28 is an illustration showing an example of a robot which utilizes a motor equipped with an information processing apparatus according to the embodiments of the present invention. This robot 3400 has first and second arms 3410, 3420, and a motor 3430. This motor 3430 is used during horizontal rotation of the second arm 3420 as the driven member. Any of the various brushless motors described above can be used as the motor 3430.

Figure 29:
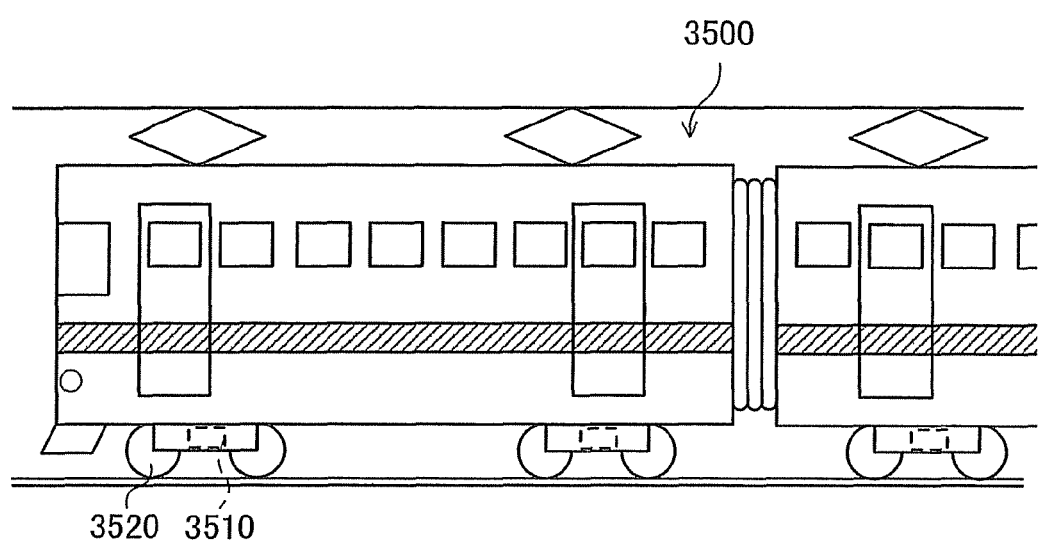
FIG. 29 is an explanatory drawing showing a railway vehicle using a motor equipped with an information processing apparatus according to the embodiment of this invention.

FIG. 29 is an explanatory drawing showing a railway vehicle using a motor equipped with an information processing apparatus according to the embodiment of this invention. This railway vehicle 3500 has a motor 3510 and a wheel 3520. This motor 3510 drives the wheel 3520. Furthermore, the motor 3510 is used as a generator when the railway vehicle 3000 is applied the brake, and regenerates power. As this motor 3510, it is possible to use the various types of brushless motor described above.

E2. Modified Example 2

The embodiments discussed above regard the brushless motor. The technique of the invention is, however, not restricted to the brushless motor but is applicable to any of diverse other motors, for example, a DC motor.

E3. Modified Example 3

In the structures of the embodiments discussed above, the stator has electromagnetic coils, while the rotor has permanent magnets. The technique of the invention is, however, applicable to a motor of a different structure where a rotor has electromagnetic coils and a stator has permanent magnets.

E4. Modified Example 4

In the structures of the embodiments discussed above, the clearance control mechanism shifts the stators 10 to change the relative clearance G. This is, however, neither essential nor restrictive. The clearance control mechanism may alternatively be designed to shift the rotor 30 and change the relative clearance G.

E5. Modified Example 5

The embodiments discussed above regard the two-phase brushless motor. The technique of the invention is, however, not restricted to the two-phase brushless motor but is also applicable to a single-phase brushless motor as well as to a brushless motor having three or a greater number of phases.

E6. Modified Example 6

In the structures of the embodiments discussed above, the relative clearance G is changed to control the torque or the rotation speed of the electric motor device. The torque or the rotation speed of the electric motor device may be controlled by changing the applied voltage as well as the relative clearance G.

F. Other Aspects

Figure 30A:
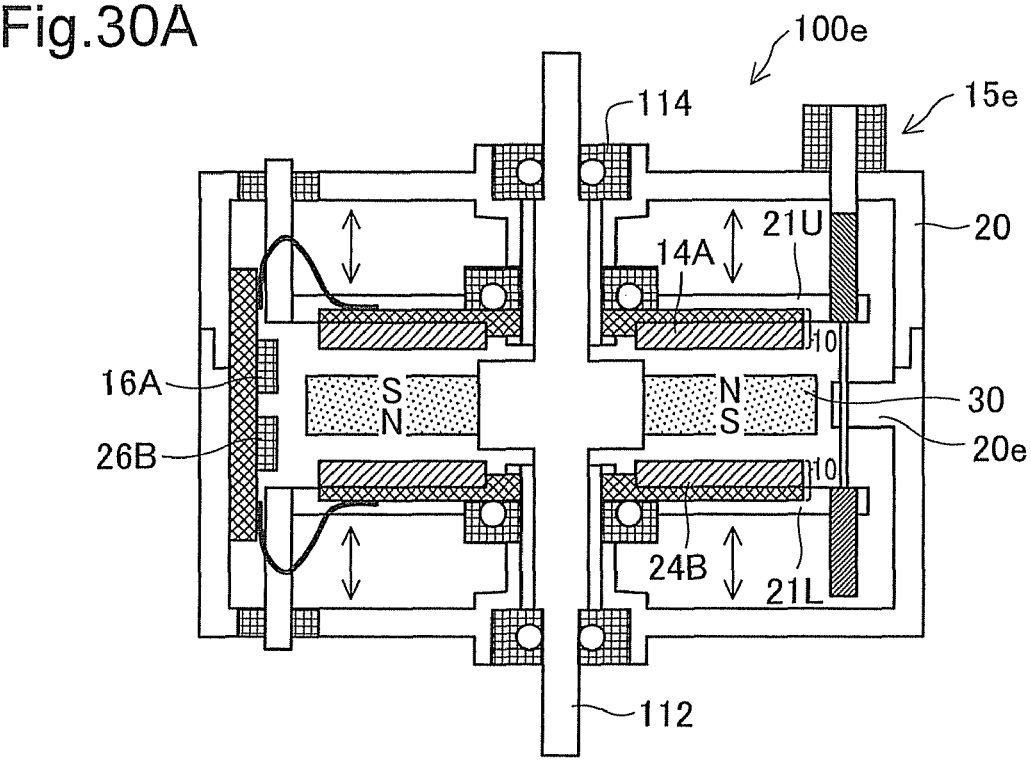
FIGS. 30A and 30B show the schematic structure of a motor main body 100e in still another embodiment of the invention.
Figure 30B:
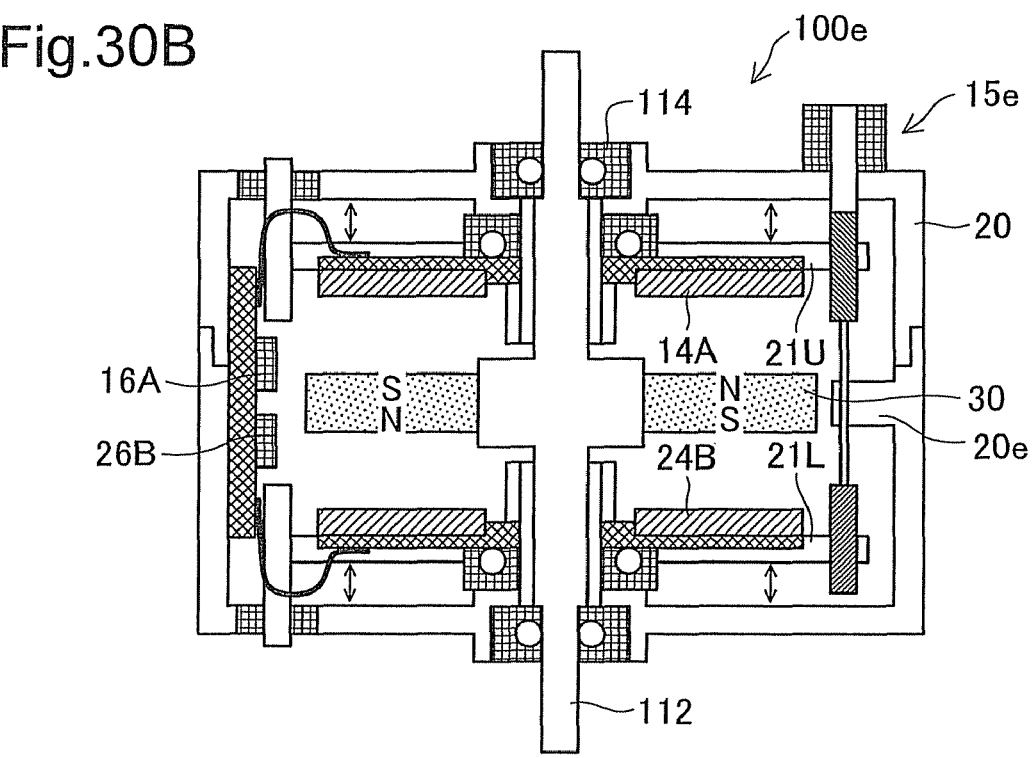

FIGS. 30A and 30B show the schematic structure of a motor main body 100e in still another embodiment of the invention. The motor main body 100e has a clearance control mechanism 15e, which has the different structure from that of the clearance control mechanism 15b included in the motor main body 100b of the second embodiment shown in FIG. 21A and FIG. 21B.

FIG. 30A shows a state before shifting the upper and the lower stators 10 by the clearance control mechanism 15e, and FIG. 30B shows a state after shifting the upper and the lower stators 10 by the clearance control mechanism 15e. As discussed below, the structure of the clearance control mechanism 15e allows the upper and the lower stators 10 to be moved simultaneously.

Figure 31:
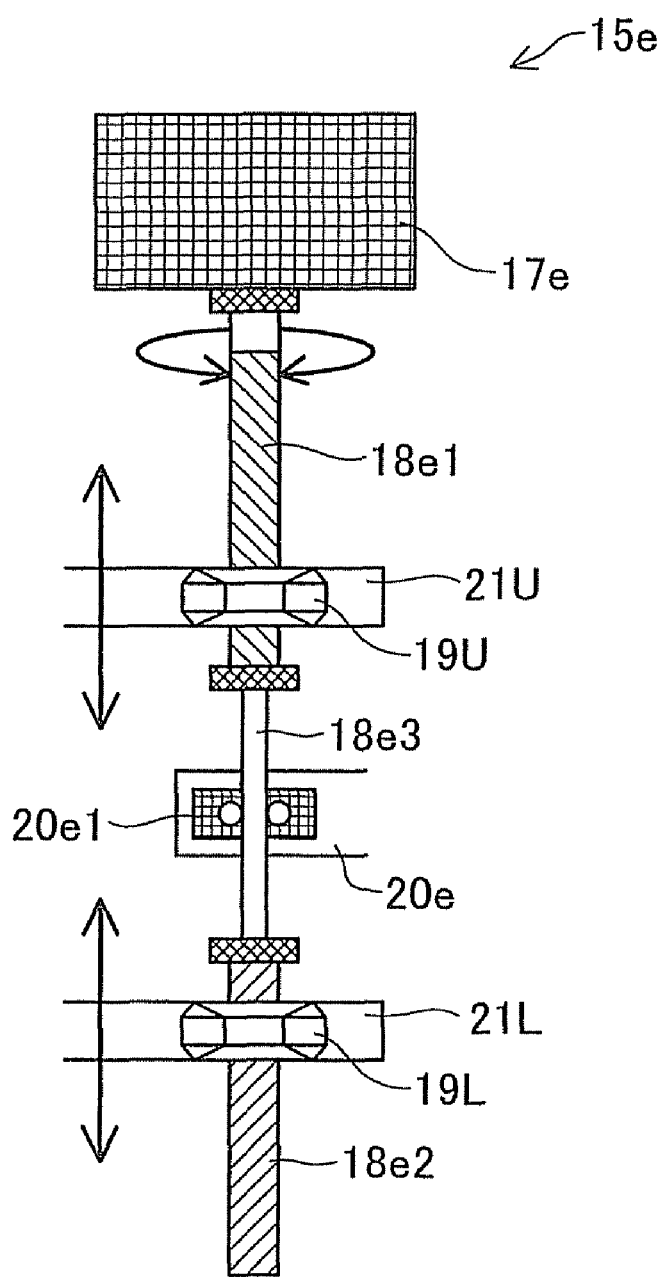
FIG. 31 shows the schematic structure of the clearance control mechanism 15e.

FIG. 31 shows the schematic structure of the clearance control mechanism 15e. The clearance control mechanism 15e has a rotary motor 17e, three rotating shafts 18e1, 18e2, and 18e3, upper and lower movable assemblies 21U and 21L, and two movable nuts 19U and 19L. The rotary motor 17e rotates the three rotating shafts 18e1, 18e2, and 18e3. The three rotating shafts 18e1, 18e2, and 18e3 are arranged on the same axis and rotate integrally. The rotating shaft 18e3 is supported by a support member 20e of the casing 20. A bearing 20e1 is provided in a contact site of the rotating shaft 18e3 and the support element 20e. The rotating shafts 18e1 and 18e2 have threads formed to respectively engage with the movable nuts 19U and 19L. The direction of the threads formed on the rotating shaft 18e1 is reverse to the direction of the threads formed on the rotating shaft 18e2. Rotating the rotating shafts 18e1 and 18e2 accordingly causes the upper movable nut 19U and the lower movable nut 19L to be moved in the opposite directions. The upper and the lower movable assemblies 21U and 21L are thus symmetrically moved about the rotor 30 in the vertical direction (see FIG. 30A and FIG. 30B).

The clearance control mechanism 15e of this embodiment utilizes the single rotary motor 17e to simultaneously shift the two stators 10 in the vertical direction and thereby change the relative clearance G. The clearance control mechanism 15e of this structure enables a change in torque or a change in rotation speed of the electric motor device by the different technique from the conventional technique of varying the applied voltage, like the structure of the first embodiment.

In the structure of the fourth embodiment shown in FIG. 24 and FIG. 24B, the two stators 10 are arranged between the two rotors 30. The clearance control mechanism 15e is applicable to this structure. The upper and the lower movable nuts 19U and 19L are provided respectively on the two stators 10 shown in FIG. 24A and FIG. 24B to symmetrically move the two stators 10 in the vertical direction (in the horizontal direction in FIG. 24A and FIG. 24B).

What is claimed is:

1. An electric motor device, comprising:
   a first drive member that has a plurality of permanent magnets;
   a second drive member that has a plurality of electromagnetic coils;
   a clearance controller that shifts at least either one of the first drive member and the second drive member, thereby changing a size of a clearance formed between the first drive member and the second drive member; and
   a magnetic sensor that detects a phase of the permanent magnets, the magnetic sensor being provided at a specific position to keep a positional relation to the permanent magnets unchanged regardless of the size of the clearance.

2. The electric motor device according to claim 1, wherein the electric motor device comprises two of the second drive members arranged across the first drive member, and wherein
   the clearance controller shifts the two second drive members to change sizes of respective clearances formed between the first drive member and the two second drive members.

3. The electric motor device according to claim 1, wherein the electric motor device comprises two of the first drive members and two of the second drive members, wherein
   the two second drive members are located between the two first drive members, and wherein
   the clearance controller shifts the two second drive members to change sizes of respective clearances formed between the first drive members and the second drive members.

4. The electric motor device according to claim 1, wherein the clearance controller sets the size of the clearance to a predetermined value depending on a relative speed of the first drive member to the second drive member.

5. The electric motor device according to claim 4, wherein the clearance controller controls the size of the clearance according to the relative speed of the first drive member to the second drive member, in order to maximize a driving force generated between the first drive member and the second drive member at the relative speed.

6. The electric motor device according to claim 1, wherein the clearance controller controls the size of the clearance according to a relative acceleration of the first drive member to the second drive member.

7. The electric motor device according to claim 1, wherein when the electric motor device is used as a generator to regenerate electric power, the clearance controller controls the size of the clearance to regulate a braking force generated between the first drive member and the second drive member.

8. An apparatus, comprising:
the electric motor device according to claim 1; and
a driven member driven by the electric motor device.

9. The apparatus according to claim 8, wherein the apparatus is a moving body.

10. The moving body according to claim 9, wherein the moving body is a rail car.

11. The apparatus according to claim 8, wherein the apparatus is a projector.

12. The apparatus according to claim 8, wherein the apparatus is a cell phone.

13. The apparatus according to claim 8, wherein the apparatus is a robot.

14. The electric motor device according to claim 2, wherein the clearance controller simultaneously shifts the two second drive members in opposite directions to change sizes of respective clearances formed between the first drive member and the two second drive members.

* * * * *